US010244490B2

(12) United States Patent
Islam et al.

(10) Patent No.: US 10,244,490 B2
(45) Date of Patent: Mar. 26, 2019

(54) SCHEDULING REQUEST TRANSMISSION TO REQUEST RESOURCES FOR A BUFFER STATUS REPORT

(71) Applicant: QUALCOMM Incorporated, San Diego, CA (US)

(72) Inventors: Muhammad Nazmul Islam, Edison, NJ (US); Sundar Subramanian, Bridgewater, NJ (US); Juergen Cezanne, Ocean Township, NJ (US); Junyi Li, Chester, NJ (US); Ashwin Sampath, Skillman, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/395,189

(22) Filed: Dec. 30, 2016

(65) Prior Publication Data

US 2017/0290003 A1    Oct. 5, 2017

Related U.S. Application Data

(60) Provisional application No. 62/318,211, filed on Apr. 5, 2016.

(51) Int. Cl.
*H04W 56/00* (2009.01)
*H04W 72/12* (2009.01)

(52) U.S. Cl.
CPC ... *H04W 56/0005* (2013.01); *H04W 72/1284* (2013.01)

(58) Field of Classification Search
CPC .. H04B 7/2121; H04B 7/2123; H04B 7/2615; H04J 2203/0069; H04J 4/00;

(Continued)

(56) References Cited

U.S. PATENT DOCUMENTS 6,958,986 B2 * 10/2005 Cain .................... H04B 7/2643
                                                  370/337
8,379,581 B2 *  2/2013 Imamura ............. H04W 52/146
                                                  370/207

(Continued)

FOREIGN PATENT DOCUMENTS

EP    2728950 A2    5/2014
EP    2858396 A2    4/2015

OTHER PUBLICATIONS

ISA/EP, International Search Report and Written Opinion of the International Searching Authority, Int'l Application No. PCT/US2017/026010, dated Jul. 19, 2017, European Patent Office, Rijswijk, NL, 13 pgs.

*Primary Examiner* — Sharad Rampuria
(74) *Attorney, Agent, or Firm* — Holland & Hart LLP

(57) ABSTRACT

A UE may receive a directional synchronization subframe from a base station and transmit a scheduling request to the base station during a time period based on the directional synchronization subframe. The scheduling request may enable a base station to grant the UE resources to send a buffer status report (BSR). The time period may be associated with a random access channel (RACH) time period. The UE may also transmit a scheduling request within a frequency region of the RACH time period. The scheduling request may be transmitted based on a received indication of a set of subcarrier, a cyclic shift, or a sequence index. In some examples, the resources used by the UE to send the BSR may include physical uplink shared channel (PUSCH) or physical uplink control channel (PUCCH) resources.

64 Claims, 18 Drawing Sheets

(58) Field of Classification Search
CPC ........... H04Q 2213/394; H04W 72/04; H04W 72/12; H04W 76/00; H04W 72/0406; H04W 72/0413; H04W 72/042; H04W 72/0426; H04W 72/044; H04L 5/26
See application file for complete search history.

(56) References Cited

U.S. PATENT DOCUMENTS

| | | |
|---|---|---|
| 8,582,514 B2 | 11/2013 | Moberg et al. |
| 8,743,814 B2 | 6/2014 | Kim |
| 8,805,387 B2 * | 8/2014 | Rosa ................. H04W 72/1284 370/216 |
| 8,929,319 B2 | 1/2015 | Anderson et al. |
| 9,571,171 B2 * | 2/2017 | Kim .................... H04W 72/046 |
| 9,893,870 B2 * | 2/2018 | Mizusawa ................. H04L 5/14 |
| 2008/0225796 A1 * | 9/2008 | Malladi ............. H04W 56/0045 370/331 |
| 2013/0163536 A1 * | 6/2013 | Anderson ......... H04W 72/1284 370/329 |
| 2015/0016350 A1 | 1/2015 | Moulsley et al. |
| 2016/0249384 A1 * | 8/2016 | Di Girolamo .... H04W 74/0808 |
| 2017/0290042 A1 | 10/2017 | Islam et al. |

* cited by examiner

SCHEDULING REQUEST TRANSMISSION TO REQUEST RESOURCES FOR A BUFFER STATUS REPORT

CROSS REFERENCES

The present application for patent claims priority to U.S. Provisional Patent Application No. 62/318,211 by Islam, et al., entitled "Scheduling Request Transmission To Request Resources for Transmitting Buffer Status Report," filed Apr. 5, 2016, assigned to the assignee hereof.

BACKGROUND

The following relates generally to wireless communication, and more specifically to a scheduling request transmission, for example, to request resources for a buffer status report (BSR).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

In some wireless communications systems, a UE may indicate to a base station that it has uplink data to transmit by sending a BSR. However, if sufficient uplink resources are not available to transmit the BSR, the UE may not be able to immediately indicate the pending uplink data. For example, if a UE is operating in a system that utilizes directional downlink control transmissions, the UE may not receive an indication in a physical downlink control channel (PDCCH) of where to transmit the BSR. As a result, communication may be delayed until the UE is able to obtain the resources to provide the BSR to the base station.

SUMMARY

A UE may receive a directional synchronization subframe from a base station and transmit a scheduling request to the base station during a time period based on the directional synchronization subframe. The time period may be associated with a random access channel (RACH). The scheduling request may enable a base station to grant the UE resources to send a buffer status report (BSR). The UE may also transmit a scheduling request within a frequency region of the RACH time period. The scheduling request may be transmitted based on a received indication of a set of subcarrier, a cyclic shift, or a sequence index. In some examples, the resources used by the UE to send the BSR may include physical uplink shared channel (PUSCH) or physical uplink control channel (PUCCH) resources.

An apparatus for wireless communication is described. The apparatus may include means for receiving a directional synchronization subframe from a base station, means for identifying a time period for transmitting a scheduling request to the base station, wherein the time period for transmitting the scheduling request is based at least in part on the directional synchronization subframe, and means for transmitting the scheduling request to the base station during the time period.

Another apparatus for wireless communication is described. The apparatus may include a processor, memory in electronic communication with the processor, and instructions stored in the memory. The instructions may be operable to cause the processor to receive a directional synchronization subframe from a base station, identify a time period for transmitting a scheduling request to the base station, wherein the time period for transmitting the scheduling request is based at least in part on the directional synchronization subframe, and transmit the scheduling request to the base station during the time period.

A non-transitory computer readable medium for wireless communication is described. The non-transitory computer-readable medium may include instructions operable to cause a processor to receive a directional synchronization subframe from a base station, identify a time period for transmitting a scheduling request to the base station, wherein the time period for transmitting the scheduling request is based at least in part on the directional synchronization subframe, and transmit the scheduling request to the base station during the time period.

Some examples of the method, apparatus, and non-transitory computer-readable medium described above may further include processes, features, means, or instructions for receiving a grant for transmitting a BSR in response to the scheduling request. Some examples of the method, apparatus, and non-transitory computer-readable medium described above may further include processes, features, means, or instructions for transmitting the BSR to the base station using resources indicated in the grant.

In some examples of the method, apparatus, and non-transitory computer-readable medium described above, the resources indicated in the grant comprise PUSCH resources, PUCCH resources, or both.

In some examples of the method, apparatus, and non-transitory computer-readable medium described above, the directional synchronization subframe comprises a set of directional synchronization signals.

Some examples of the method, apparatus, and non-transitory computer-readable medium described above may further include processes, features, means, or instructions for identifying a directional signal from the set of directional synchronization signals, wherein the time period for transmitting the scheduling request may be based at least in part on the identified directional signal.

In some examples of the method, apparatus, and non-transitory computer-readable medium described above, each set of directional synchronization signals comprises a primary synchronization signal, a secondary synchronization signal, a beam reference signal, or any combination thereof.

Some examples of the method, apparatus, and non-transitory computer-readable medium described above may further include processes, features, means, or instructions for receiving an indication of at least one of a cyclic shift, a set of subcarriers, or a sequence index from the base station, wherein the scheduling request may be transmitted using the cyclic shift, the set of subcarriers, the sequence index, or a combination thereof.

In some examples of the method, apparatus, and non-transitory computer-readable medium described above, the scheduling request comprises a sequence repeated a plurality of times over a plurality of symbol periods.

In some examples of the method, apparatus, and non-transitory computer-readable medium described above, the time period for transmitting the scheduling request may be associated with a RACH.

Some examples of the method, apparatus, and non-transitory computer-readable medium described above may further include processes, features, means, or instructions for identifying a frequency region associated with the RACH and a frequency region associated with scheduling requests that does not overlap with the frequency region associated with the RACH, wherein the scheduling request may be transmitted using resources located within the frequency region associated with scheduling requests.

Some examples of the method, apparatus, and non-transitory computer-readable medium described above may further include processes, features, means, or instructions for identifying a cyclic prefix length for the scheduling request, wherein the cyclic prefix length comprises a long cyclic prefix length associated with the RACH or a short cyclic prefix length associated with non-RACH transmissions.

A method of wireless communication is described. The method may include transmitting a directional synchronization subframe to a UE and receiving a scheduling request from the UE during a time period selected by the UE based at least in part on the directional synchronization subframe.

An apparatus for wireless communication is described. The apparatus may include means for transmitting a directional synchronization subframe to a UE and means for receiving a scheduling request from the UE during a time period selected by the UE based at least in part on the directional synchronization subframe.

Another apparatus for wireless communication is described. The apparatus may include a processor, memory in electronic communication with the processor, and instructions stored in the memory. The instructions may be operable to cause the processor to transmit a directional synchronization subframe to a UE and receive a scheduling request from the UE during a time period selected by the UE based at least in part on the directional synchronization subframe.

A non-transitory computer readable medium for wireless communication is described. The non-transitory computer-readable medium may include instructions operable to cause a processor to transmit a directional synchronization subframe to a user equipment (UE) and receive a scheduling request from the UE during a time period selected by the UE based at least in part on the directional synchronization subframe.

Some examples of the method, apparatus, and non-transitory computer-readable medium described above may further include processes, features, means, or instructions for transmitting a grant for transmitting a BSR in response to the scheduling request. Some examples of the method, apparatus, and non-transitory computer-readable medium described above may further include processes, features, means, or instructions for receiving the BSR from the UE using resources indicated in the grant.

In some examples of the method, apparatus, and non-transitory computer-readable medium described above, the resources indicated in the grant comprises PUSCH resources, PUCCH resources, or both.

In some examples of the method, apparatus, and non-transitory computer-readable medium described above, the time period for receiving the scheduling request may be associated with a RACH.

Some examples of the method, apparatus, and non-transitory computer-readable medium described above may further include processes, features, means, or instructions for identifying a frequency region associated with the RACH and a frequency region associated with scheduling requests that does not overlap with the frequency region associated with the RACH, wherein the scheduling request may be received using resources located within the frequency region associated with scheduling requests.

Some examples of the method, apparatus, and non-transitory computer-readable medium described above may further include processes, features, means, or instructions for identifying a cyclic prefix length for the scheduling request, wherein the cyclic prefix length comprises a long cyclic prefix length associated with the RACH or a short cyclic prefix length associated with non-RACH transmissions.

Some examples of the method, apparatus, and non-transitory computer-readable medium described above may further include processes, features, means, or instructions for transmitting an indication of at least one of a cyclic shift, a set of subcarriers, or a sequence index to the UE, wherein the scheduling request may be received using the cyclic shift, the set of subcarriers, the sequence index, or combinations thereof.

In some examples of the method, apparatus, and non-transitory computer-readable medium described above, the scheduling request comprises a sequence repeated a plurality of times over a plurality of symbol periods.

DETAILED DESCRIPTION

Some wireless communication systems may operate in millimeter wave (mmW) frequency ranges, e.g., 28 GHz, 40

GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. UEs may use random access procedures to establish a connection and communicate with a network. For example, a UE may determine that it has data to send and use random access procedures to initiate a data transfer with a base station.

In some cases, a UE may send transmissions to a base station, such as a buffer status report (BSR), to indicate that it has uplink data to send. However, there may not be enough resources available to transmit the BSR when a UE has an opportunity to do so. As a result, the UE may send a scheduling request seeking an uplink grant from the base station. Due to the increased amount of path loss in mmW communications systems, transmissions from the UE may be beamformed. Thus, uplink control channels may be received at a base station in a directional manner from multiple UEs. In cases where uplink channel transmission may be dynamically scheduled, UEs associated with a duration of inactivity may not have uplink control channel resources available to transmit a scheduling request, which may impede its ability to efficiently communicate.

In some cases, a UE may transmit a scheduling request during a time period allocated for random access procedures. For example, a UE may identify a random access channel subframe, and transmit the scheduling request during the random access subframe. The scheduling request may be used to obtain a grant for uplink channel resources (e.g., a physical uplink control channel (PUCCH) or a physical uplink shared channel (PUSCH)) to be used for the transmission of a BSR. The scheduling request may be transmitted using resources in the random access subframe that are different from the resources used for a random access message. For example, a region of unoccupied bandwidth in a random access subframe may be used to transmit the scheduling request, where a different frequency bandwidth is allocated for random access messages.

Aspects of the disclosure are initially described in the context of a wireless communication system. Further examples are then provided for transmitting a scheduling request in a random access subframe. Aspects of the disclosure are further illustrated by and described with reference to apparatus diagrams, system diagrams, and flowcharts that relate to scheduling request transmission to request resources for a BSR.

Figure 1:
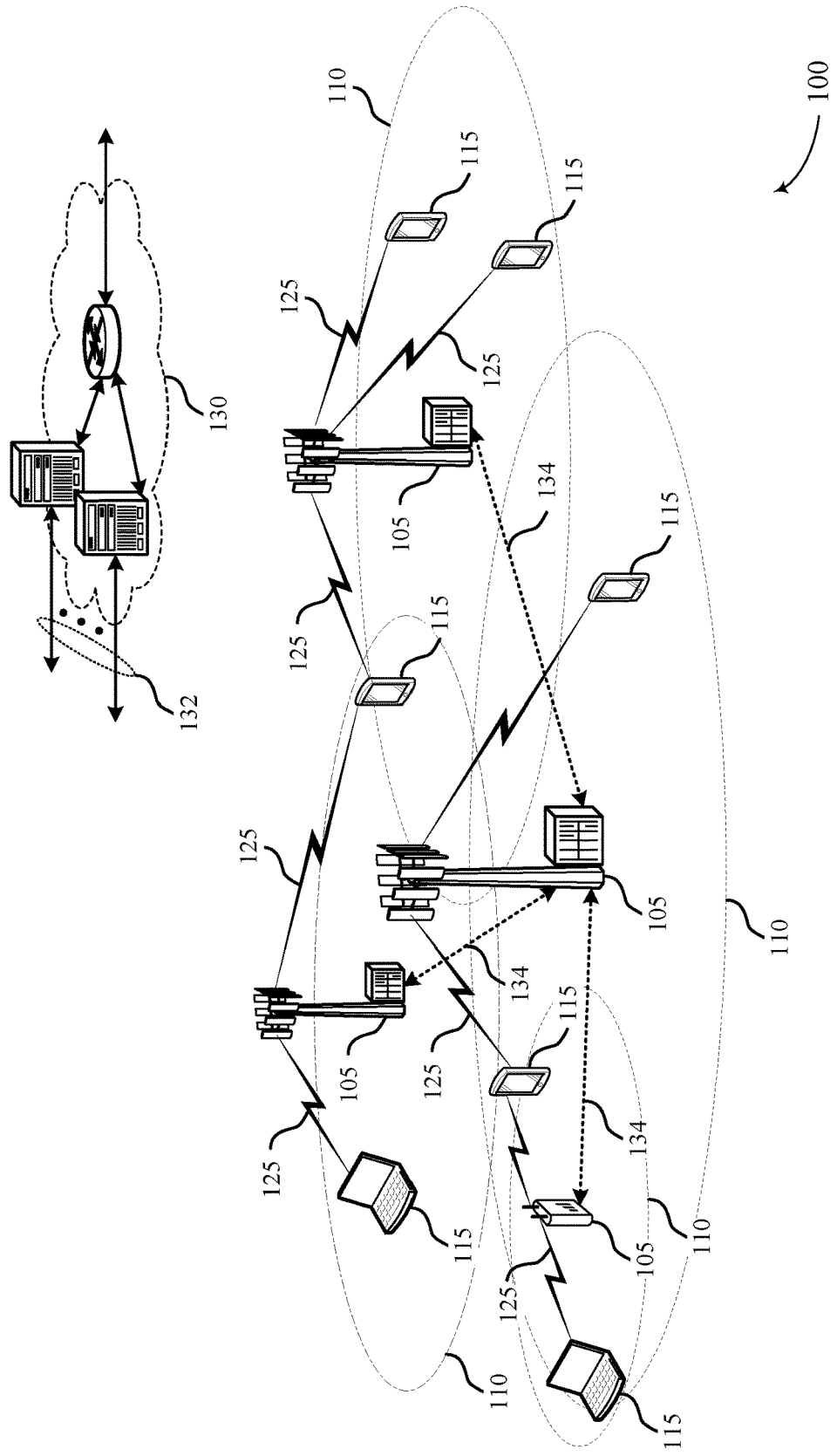
FIG. 1 illustrates an example of a wireless communications system that supports scheduling request transmission to request resources for, for example, a buffer status report (BSR) in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Wireless communications system 100 may represent an example of a system where a UE 115 efficiently acquires uplink resources by transmitting a scheduling request in a random access subframe.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Some wireless communication systems may operate in mmW frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies.

In mmW systems, synchronization signals may be beamformed to meet a certain link budget (e.g., an accounting of gains and losses associated with transmitters and receivers when communicating over a medium). In such cases, base stations 105 may use multiple antenna ports connected to subarrays of antennas to form the beams in various directions using a number of analog weight factors. A base station 105 may thus transmit synchronization symbols in multiple directions, where the direction may change in each symbol of a synchronization subframe.

UEs 115 may use random access procedures to establish a connection and communicate with a network. For example, a UE 115 may determine that it has data to send and use random access procedures to initiate a data transfer with a base station 105. In some cases, one or more UEs 115 may seek resources to send data and subsequently transmit a random access sequence or preamble to the base station. The base station 105 may detect the random access sequence transmissions from the one or more UEs 115 and assign resources for communication. Random access message transmissions may be based on the synchronization signal received from a base station 105. For example, the transmission of synchronization symbols from a base station may be used by a UE 115 to identify timing and/or frequency resources to send the random access message.

In some cases, a UE 115 may identify a specific beam associated with a synchronization signal (e.g., a beam with the highest SNR) and further identify a symbol during which that beam was transmitted (e.g., using a symbol index). The UE 115 may then select a number of symbols based on a symbol index to transmit a random access message based on the symbol associated with the synchronization beam. For example, a UE 115 may determine a synchronization beam was transmitted during a first symbol and may correspondingly transmit the random access message during the first two symbols of a random access subframe. A different UE 115 may identify a second synchronization beam and transmit a random access message on different symbols. If both UEs 115 identify the same synchronization beam (transmitted during the same symbol) they may attempt to transmit the random access message using the same resources. However, when random access messages are spread over multiple symbols of a random access subframe, the base station 105 may differentiate between the UEs 115 and proceed to assign resources. In some examples, a UE 115 may randomly select a subcarrier of a radio frequency band or randomly select a component carrier to transmit the random access message.

In some cases, a UE 115 may send transmissions to a base station 105, such as a buffer status report (BSR), to indicate that it has uplink data to send. For example, a UE 105 may determine that it has uplink data to transmit and transmit a BSR to a base station 105 to obtain uplink resources. In some cases, the UE 105 may utilize a PUSCH to transmit the BSR. However, there may not be enough resources available to transmit the BSR when a UE 115 has an opportunity to do so. As a result, the UE 115 may send a scheduling request seeking an uplink grant from the base station.

Scheduling requests may be transmitted using an uplink control channel (e.g., a PUCCH). Alternatively, if control channel resources are not allocated to the UE 115 or the control channel is not configured for a scheduling request, a random access procedure may be used by the UE 115 (e.g., where a random sequence or preamble is transmitted to enable the base station to identify the UE). Due to the increased amount of path loss in mmW communications systems, transmissions from the UE 115 may be beamformed. Thus, uplink control channels may be received at a base station 105 in a directional manner from multiple UEs 115.

As described herein, a UE 115 may transmit a scheduling request to a base station 105 during a time period which may be associated with a RACH, where the scheduling request may enable a base station to grant the UE 115 resources to send a BSR. In some cases, the UE 115 may identify the time period based on synchronization information transmitted by the base station. The UE 115 may also transmit a scheduling request within a frequency region of the time period. The scheduling request may be transmitted based on a received indication of a set of subcarrier, a cyclic shift, or a sequence index. In some examples, the resources used by the UE 115 to send the BSR may include PUSCH or PUCCH resources.

Figure 2:
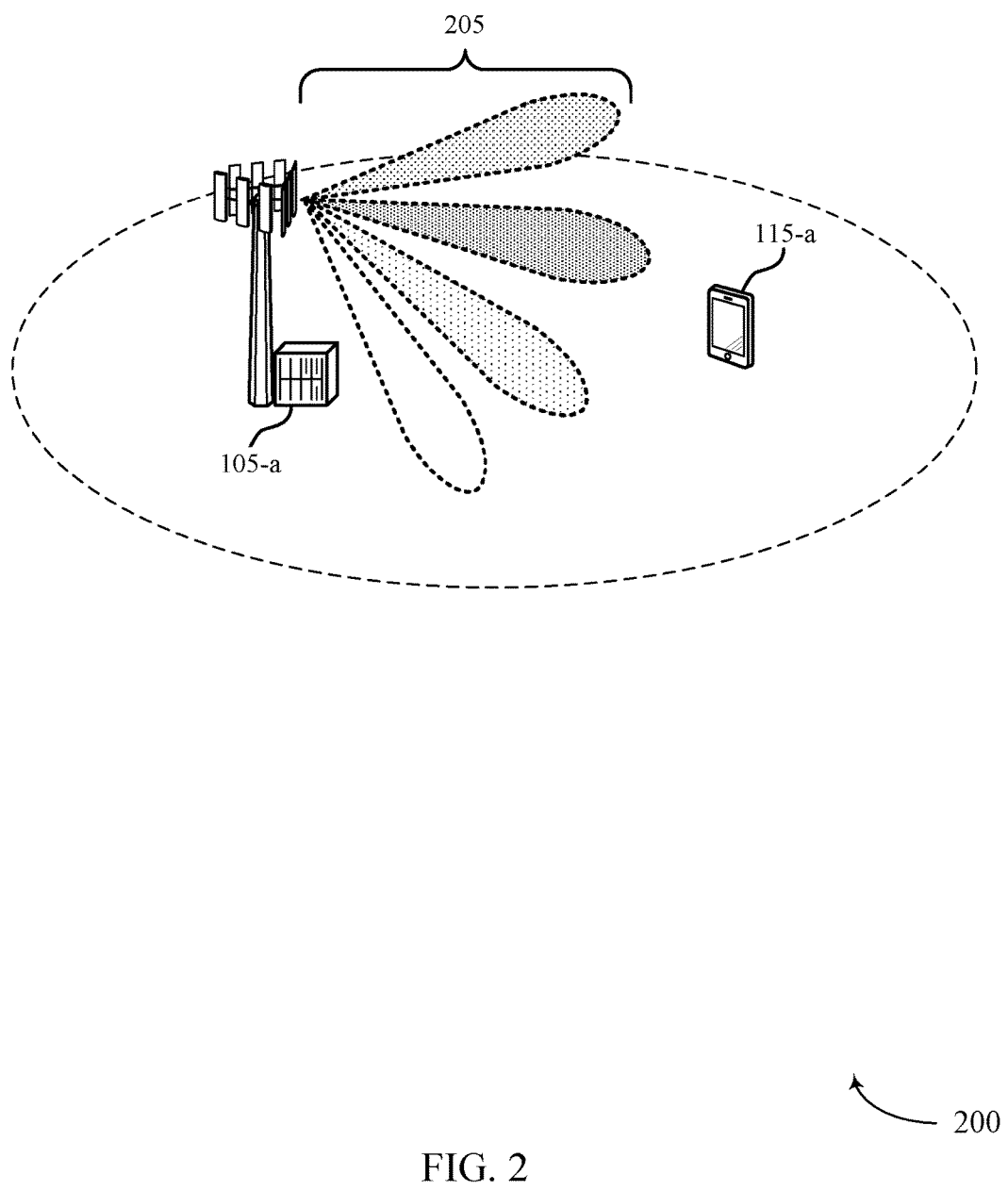
FIG. 2 illustrates an example of a wireless communications system that supports scheduling request transmission to request resources for, for example, a BSR in accordance with aspects of the present disclosure.

FIG. 2 illustrates an example of a wireless communications system 200 for scheduling request transmission to request resources for a BSR. Wireless communications system 200 may include base station 105-a and UE 115-a, which may be examples of the corresponding devices described with reference to FIG. 1. Wireless communication system 200 may illustrate an example of transmitting a scheduling request during a random access subframe.

In wireless communication system 200, UE 105-a may transmit a scheduling request during a time period allocated for random access procedures. For example, a UE may identify a random access subframe, and transmit the scheduling request during the random access subframe. The scheduling request may be used to obtain a grant for uplink channel resources (e.g., PUCCH or PUSCH) to be used for the transmission of a BSR.

In some examples, the scheduling request may be transmitted using resources in the random access subframe that are different from the resources used for a random access message. For example, a region of unoccupied bandwidth in a random access subframe may be used to transmit the scheduling request, where a different frequency bandwidth is allocated for random access messages. In some cases, the transmission of synchronization beams 205 from a base station 105-a may be used by UE 115-a to identify timing and/or frequency resources to send a random access subframe. In such cases, a certain synchronization beam or a set of synchronization beams may correspond to different symbols during which the scheduling request may be transmitted to the base station.

In some cases, the frequency region in the random access subcarrier used for the scheduling request may be associated with a shorter cyclic prefix in comparison to the region used for random access messages. For example, a timing error associated with a round trip time or delay spread may already be corrected when a UE transmits the scheduling request. As a result, a comparatively larger number of cyclic shifts (e.g., up to 12 cyclic shifts) may be used for the scheduling request frequency region. A base station may assign a cyclic shift and a frequency region (such as one or more subcarriers) to be used by the UE for the transmission of the scheduling request.

Figure 3:
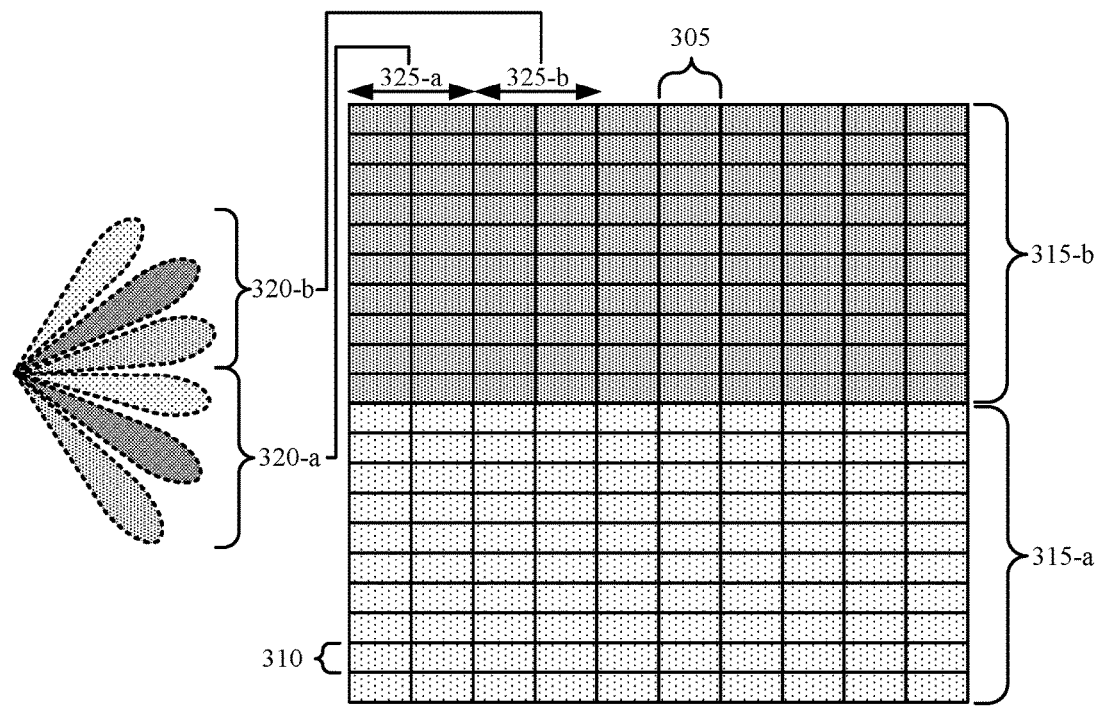
FIG. 3 illustrates an example of a random access channel (RACH) subframe in a system that supports scheduling request transmission to request resources for, for example, a BSR in accordance with aspects of the present disclosure.

FIG. 3 illustrates an example of a RACH subframe 300 in a system that supports scheduling request transmission to request resources for a BSR. In some cases, RACH subframe 300 may represent aspects of techniques performed by a UE 115 or base station 105 as described with reference to FIGS. 1-2. RACH subframe 300 may illustrate an example of the transmission of a scheduling request during a RACH time period to enable efficient uplink resource allocation.

RACH subframe 300 may include multiple symbols 305 and subcarriers 310 used by a UE 115 for the transmission of various signals. In some cases, RACH subframe 300 may include different radio frequency regions 315, where each frequency region my include multiple subcarriers 310. In some cases, these frequency regions 315 may be associated with different types of transmissions. For example, a first frequency region 310-a may be used for a random access message transmissions, where a random access message may be transmitted using, or spread across, multiple symbols 305. A second frequency region 310-b may be used for the transmission of signals that are not associated with random access processes.

In an example, second frequency region 315-b may be used for the transmission of scheduling requests during the same RACH time period. For example, A UE 115 may use second frequency region 310-b to transmit a scheduling request over multiple symbols 305 while the first frequency region may be reserved for RACH preamble transmissions. The first frequency region 315-a and the second frequency region 315-b may not overlap.

A scheduling request preamble may include a cyclic prefix, for example of length $T_{CP}$ and a sequence part of length $T_{SEQ}$. $T_{CP}$ and $T_{SEQ}$ may each have the same values as their respective RACH preamble counterparts. In some examples, $T_{CP}$ may be 656 $T_S$ long and $T_{SEQ}$ may be 2048 $T_S$ long. The scheduling request preamble may be generated based on Zadoff-Chu sequences. The network may configure a set of preamble sequences for the UE. UEs in the network may cyclically shift based on a scheduling request sequence length (, 2048 samples) and a maximum delay spread (e.g., 144 samples). The network may allocate resources sufficient to allow, for example, up to 12 cyclic shifts among the UEs 115. The RACH subframe 300 may provide 8 scheduling request bands, where each scheduling request band may occupy 6 resource blocks. In some examples, the band used by the UE 115 may be based on a number of scheduling requests.

In some cases, a UE 115 may use a synchronization beam to identify a symbol index to transmit the scheduling request. For example, multiple synchronization beams may be sent by a base station 105. A first subset of synchronization beams 320-a may be identified by the UE 115 and a symbol index may be used to send a first scheduling request over a first symbol group 325-a. Similarly, a second subset of synchronization beams 320-b may provide a different symbol index, and the UE 115 may transmit the scheduling request using a second symbol group 325-b. In some cases, a certain synchronization beam (e.g., a beam within either the first subset of synchronization beams 320-a or the second subset of synchronization beams 320-b) may be identified by the UE 115 and used to identify the symbol index. In some cases, the beam may be identified as having the greatest signal-to-noise ratio (SNR). Additionally or alternatively, the base station 105 may also provide the UE with a cyclic shift and a subcarrier region to be used to transmit the scheduling request within the second frequency region 315-b.

A UE may identify parameters to determine symbols of a RACH signal. For example, the UE may identify a system frame number (SFN), a beamforming reference signal (BRS) transmission period, a number of symbols ($N_{RACH}$) during the RACH subframe 300 for which the base station may apply different reception beams, a number of RACH subframes (M) in a radio frame, an index of a RACH subframe (m), and the symbol with the strongest sync beam ($S_{Sync}^{BestBeam}$).

In some examples, RACH subframe 300 may use the same beams as a synchronization subframe and in the same order. For example, if an mth RACH subframe occurs within in radio frame with the same SFN, the m-th RACH subframe may use the beams of the synchronization symbols identified by the set $$(M*SFN*N_{RACH}+m*N_{RACH}+(0: N_{RACH}-1)) \bmod (N_{BRSs}), m \in \{0, \ldots M-1\}.$$

If $S_{Synch}^{BestBeam}$ included in the set of symbols, the UE may transmit a RACH preamble during the RACH subframe 300. The transmission may begin at symbol $$l=((S_{Sync}^{BestBeam}-(SFN*M*N_{RACH}+m*N_{RACH}) \bmod (N_{BRS})) \bmod (N_{BRS}))N_{rep},$$

where $N_{rep}$ may denote the number of symbols used for a single RACH transmission.

Figure 4:
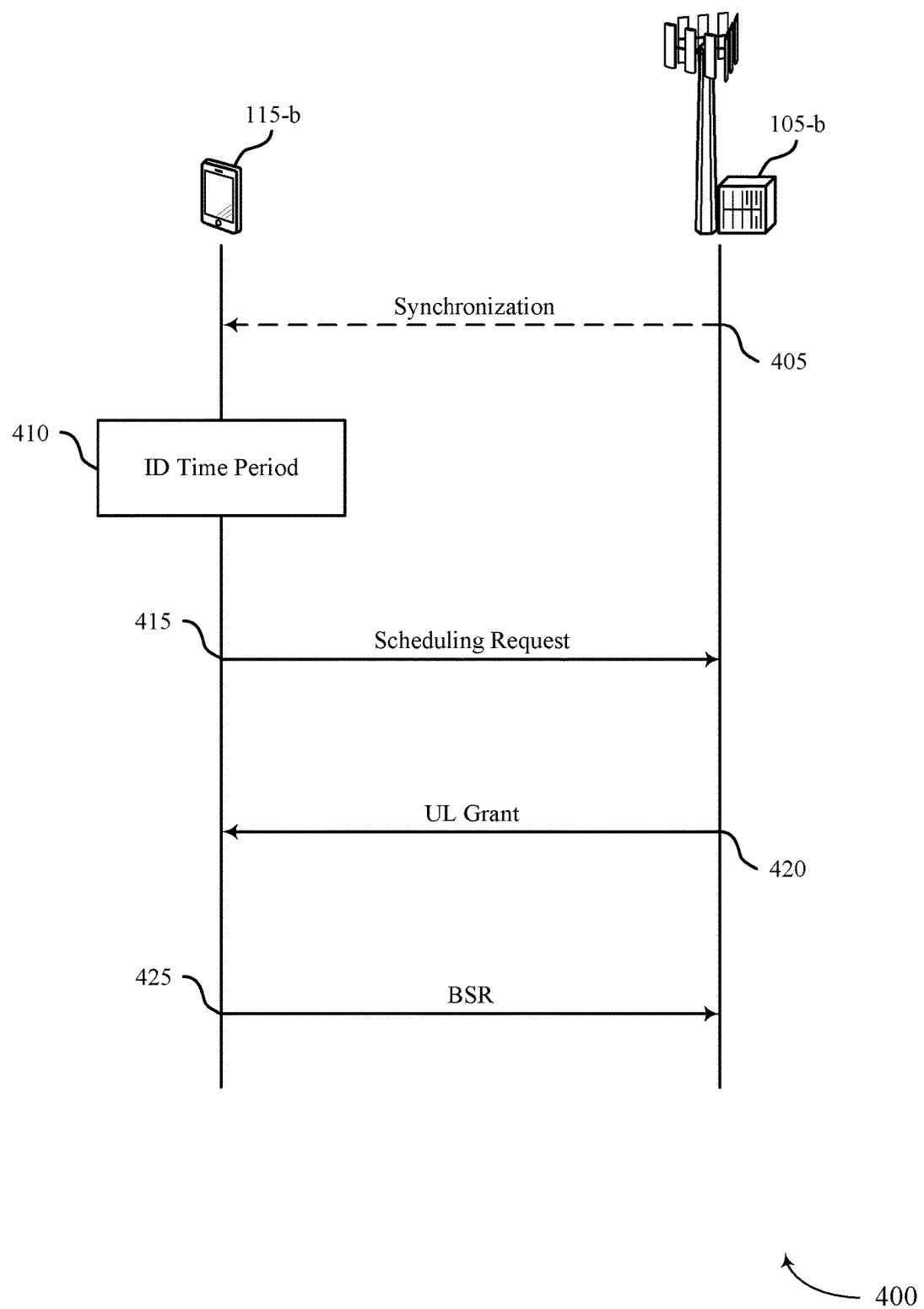
FIG. 4 illustrates an example of a process flow in a system that supports scheduling request transmission to request resources for, for example, a BSR in accordance with aspects of the present disclosure.

FIG. 4 illustrates an example of a process flow 400 for scheduling request transmission to request resources for a BSR in accordance with various aspects of the present disclosure. Process flow 400 may include base station 105-a and UE 115-a, which may be examples of the corresponding devices described with reference to FIG. 1-2.

At step 405, UE 115-b may receive a directional synchronization subframe from base station 105-b. At step 410, UE 115-b may identify a time period for transmitting a scheduling request. The directional synchronization subframe may include a set of directional synchronization signals, and the time period may be based on identifying a directional signal from the set of directional synchronization signals. The directional synchronization signals may contain one or more combinations of a primary synchronization signal, a secondary synchronization signal, or a beam reference signal. In some examples, the time period may be associated with a RACH. The time period may be identified based on the received directional synchronization subframe. In such cases, UE 115-b may identify the directional synchronization subframe from a set of directional subframes transmitted by base station 105-b based on a signal strength of the directional synchronization subframe.

At step 415, UE 115-b may transmit a scheduling request to a base station during the time period associated with the RACH. In some examples, UE 115-b may receive an indication of at least one of a cyclic shift, a set of subcarriers, or a sequence index from the base station, where the scheduling request is transmitted using the cyclic shift, the set of subcarriers, the sequence index, or a combination thereof. Additionally or alternatively, UE 115-b may identify a frequency region associated with the RACH and a frequency region associated with scheduling requests that does not overlap with the frequency region associated with the RACH, where the scheduling request is transmitted using resources located within the frequency region associated with scheduling requests. In some cases, the scheduling request includes a sequence repeated a plurality of times over a plurality of symbol periods.

At step 420, base station 105-b may transmit, and UE 115-b may receive, a grant for transmitting a BSR in response to the scheduling request. In some cases, the resources indicated in the grant include PUSCH resources, PUCCH resources, or both. At step 425, UE 115-b may transmit the BSR to base station 105-b using resources indicated in the grant.

Figure 5:
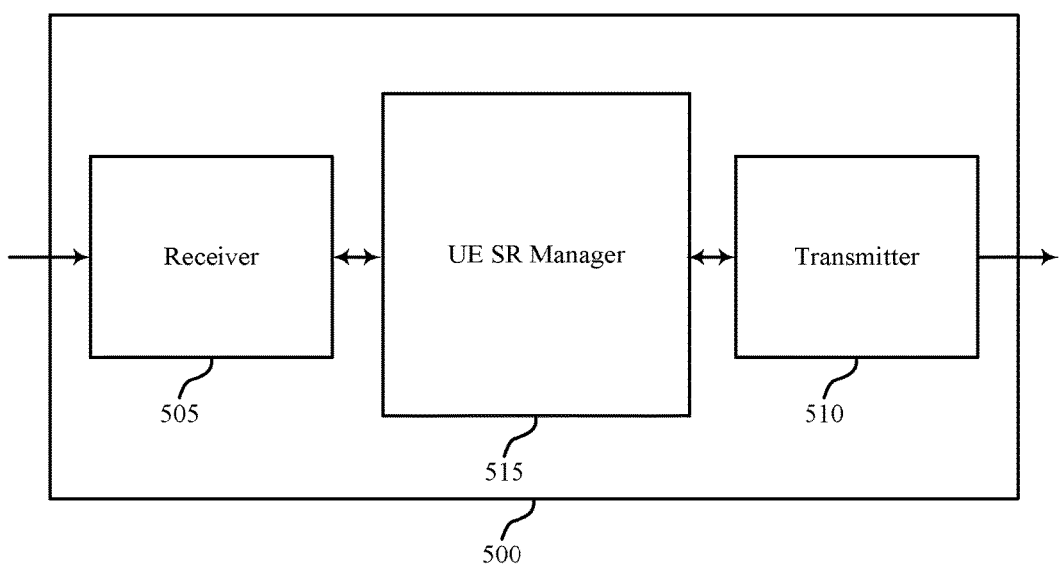
FIGS. 5 through 7 show block diagrams of a wireless device that supports scheduling request transmission to request resources for, for example, a BSR in accordance with aspects of the present disclosure.

FIG. 5 shows a block diagram of a wireless device 500 that supports scheduling request transmission to request resources for a BSR in accordance with various aspects of the present disclosure. Wireless device 500 may be an example of aspects of a UE 115 described with reference to FIGS. 1 and 2. Wireless device 500 may include receiver 505, transmitter 510 and UE SR manager 515. Wireless device 500 may also include a processor. Each of these components may be in communication with each other.

The receiver 505 may receive information such as packets, user data, or control information associated with various information channels (e.g., control channels, data channels, and information related to scheduling request transmission to request resources for a BSR, etc.). Information may be passed on to other components of the device. The receiver 505 may be an example of aspects of the transceiver 825 described with reference to FIG. 8.

The transmitter 510 may transmit signals received from other components of wireless device 500. In some examples, the transmitter 510 may be collocated with a receiver in a transceiver module. For example, the transmitter 510 may be an example of aspects of the transceiver 825 described with reference to FIG. 8. The transmitter 510 may include a single antenna, or it may include a plurality of antennas.

The UE SR manager 515 may identify a time period for transmitting a scheduling request and transmit a scheduling request to a base station during the time period. In some examples, the time period may be associated with a RACH In some examples, the UE SR manager 515 may receive a grant for transmitting a BSR in response to the scheduling request, and transmit the BSR to the base station using resources indicated in the grant. The UE SR manager 515 may also be an example of aspects of the UE SR manager 805 described with reference to FIG. 8.

Figure 6:
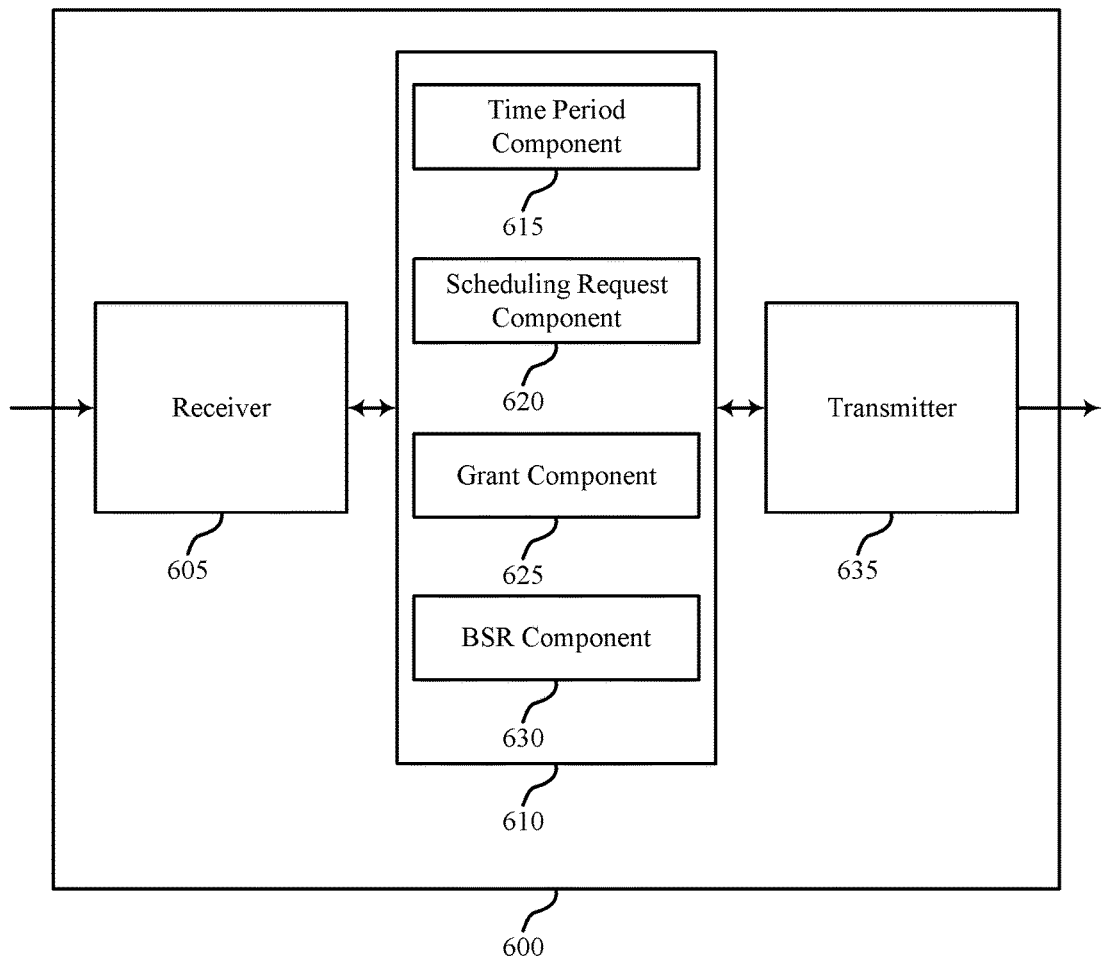

FIG. 6 shows a block diagram of a wireless device 600 that supports scheduling request transmission to request resources for a BSR in accordance with various aspects of the present disclosure. Wireless device 600 may be an example of aspects of a wireless device 500 or a UE 115 described with reference to FIGS. 1, 2 and 5. Wireless device 600 may include receiver 605, UE SR manager 610 and transmitter 635. Wireless device 600 may also include a processor. Each of these components may be in communication with each other.

The receiver 605 may receive information which may be passed on to other components of the device. The receiver 605 may also perform the functions described with reference to the receiver 505 of FIG. 5. The receiver 605 may be an example of aspects of the transceiver 825 described with reference to FIG. 8.

The UE SR manager 610 may be an example of aspects of UE SR manager 515 described with reference to FIG. 5. The UE SR manager 610 may include time period component 615, scheduling request component 620, grant component 625 and BSR component 630. The UE SR manager 610 may be an example of aspects of the UE SR manager 805 described with reference to FIG. 8.

The time period component 615 may identify a time period for transmitting a scheduling request. In some examples, the time period may be associated with a RACH. The scheduling request component 620 may transmit a scheduling request to a base station during the time period. In some cases, the scheduling request includes a sequence repeated a set of times over a set of symbol periods.

The grant component 625 may receive a grant for transmitting a BSR in response to the scheduling request. In some cases, the resources indicated in the grant include PUSCH resources, PUCCH resources, or both. The BSR component 630 may transmit the BSR to the base station using resources indicated in the grant.

The transmitter 635 may transmit signals received from other components of wireless device 600. In some examples, the transmitter 635 may be collocated with a receiver in a transceiver module. For example, the transmitter 635 may be an example of aspects of the transceiver 825 described with reference to FIG. 8. The transmitter 635 may utilize a single antenna, or it may utilize a plurality of antennas.

Figure 7:
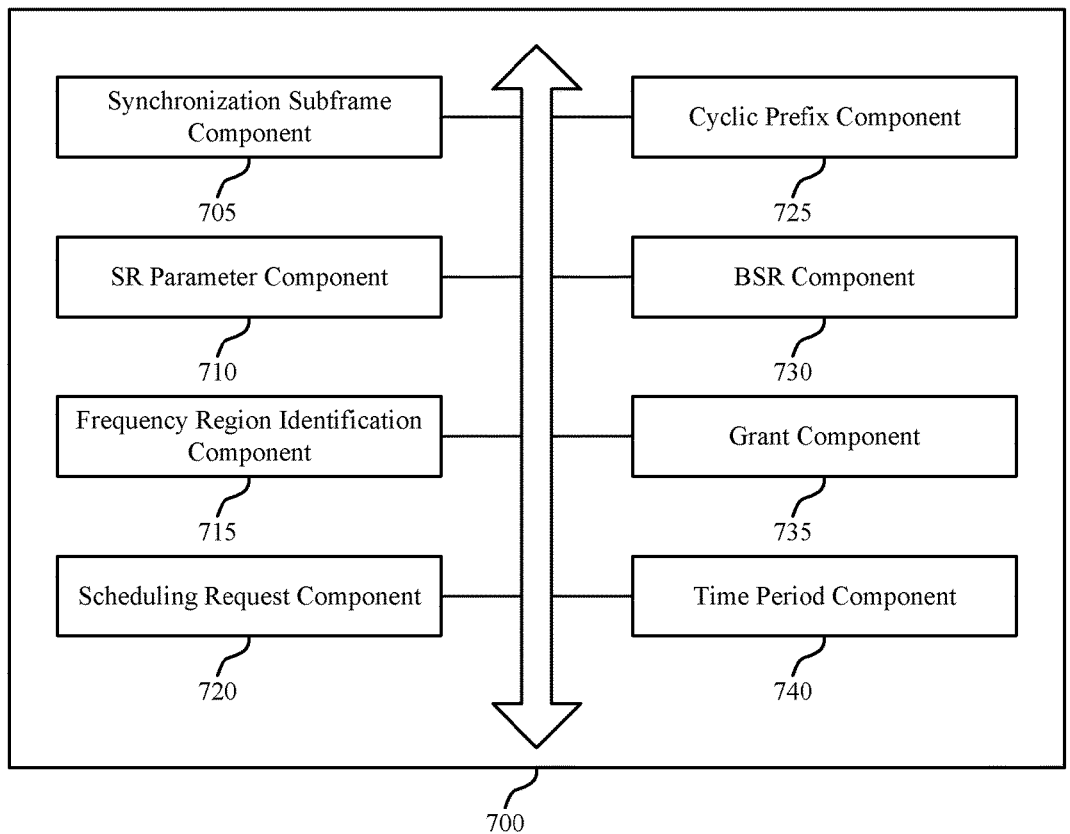

FIG. 7 shows a block diagram of a UE SR manager 700 which may be an example of the corresponding component of wireless device 500 or wireless device 600. That is, UE SR manager 700 may be an example of aspects of UE SR manager 515 or UE SR manager 610 described with reference to FIGS. 5 and 6. The UE SR manager 700 may also be an example of aspects of the UE SR manager 805 described with reference to FIG. 8.

The UE SR manager 700 may include synchronization subframe component 705, SR parameter component 710, frequency region identification component 715, scheduling request component 720, cyclic prefix component 725, BSR component 730, grant component 735 and time period component 740. Each of these modules may communicate, directly or indirectly, with one another (e.g., via one or more buses).

The synchronization subframe component 705 may receive a directional synchronization subframe from the base station, where the time period for transmitting a scheduling request is identified based on the received directional synchronization subframe, and identify the directional synchronization subframe from a set of directional subframes transmitted by the base station based on a signal strength of the directional synchronization subframe. The directional synchronization subframe may include a set of directional synchronization signals, and the time period may be based on identifying a directional signal from the set of directional synchronization signals. The directional synchronization signals may contain one or more combinations of a primary synchronization signal, a secondary synchronization signal, or a beam reference signal.

The SR parameter component 710 may receive an indication of at least one of a cyclic shift, a set of subcarriers, or a sequence index from the base station, where the scheduling request is transmitted using the cyclic shift, the set of subcarriers, the sequence index, or a combination thereof. In some examples, the SR parameter component 710 may also receive one or more of a system frame number, a BRS transmission period, a number of RACH subframes in a radio frame, an index of a current RACH subframe, or a symbol with the strongest synchronization beam.

The frequency region identification component 715 may identify a frequency region associated with the RACH and a frequency region associated with scheduling requests that does not overlap with the frequency region associated with the RACH, where the scheduling request is transmitted using resources located within the frequency region associated with scheduling requests.

The scheduling request component 720 may transmit a scheduling request to a base station during the time period. In some cases, the scheduling request includes a sequence repeated a set of times over a set of symbol periods.

The cyclic prefix component 725 may identify a cyclic prefix length for the scheduling request, where the cyclic prefix length includes a long cyclic prefix length associated with the RACH or a short cyclic prefix length associated with non-RACH transmissions.

The BSR component 730 may transmit the BSR to the base station using resources indicated in the grant. The grant component 735 may receive a grant for transmitting a BSR in response to the scheduling request. In some cases, the resources indicated in the grant include PUSCH resources, PUCCH resources, or both. The time period component 740 may identify a time period for transmitting a scheduling request. In some examples, the time period may be associated with a RACH.

Figure 8:
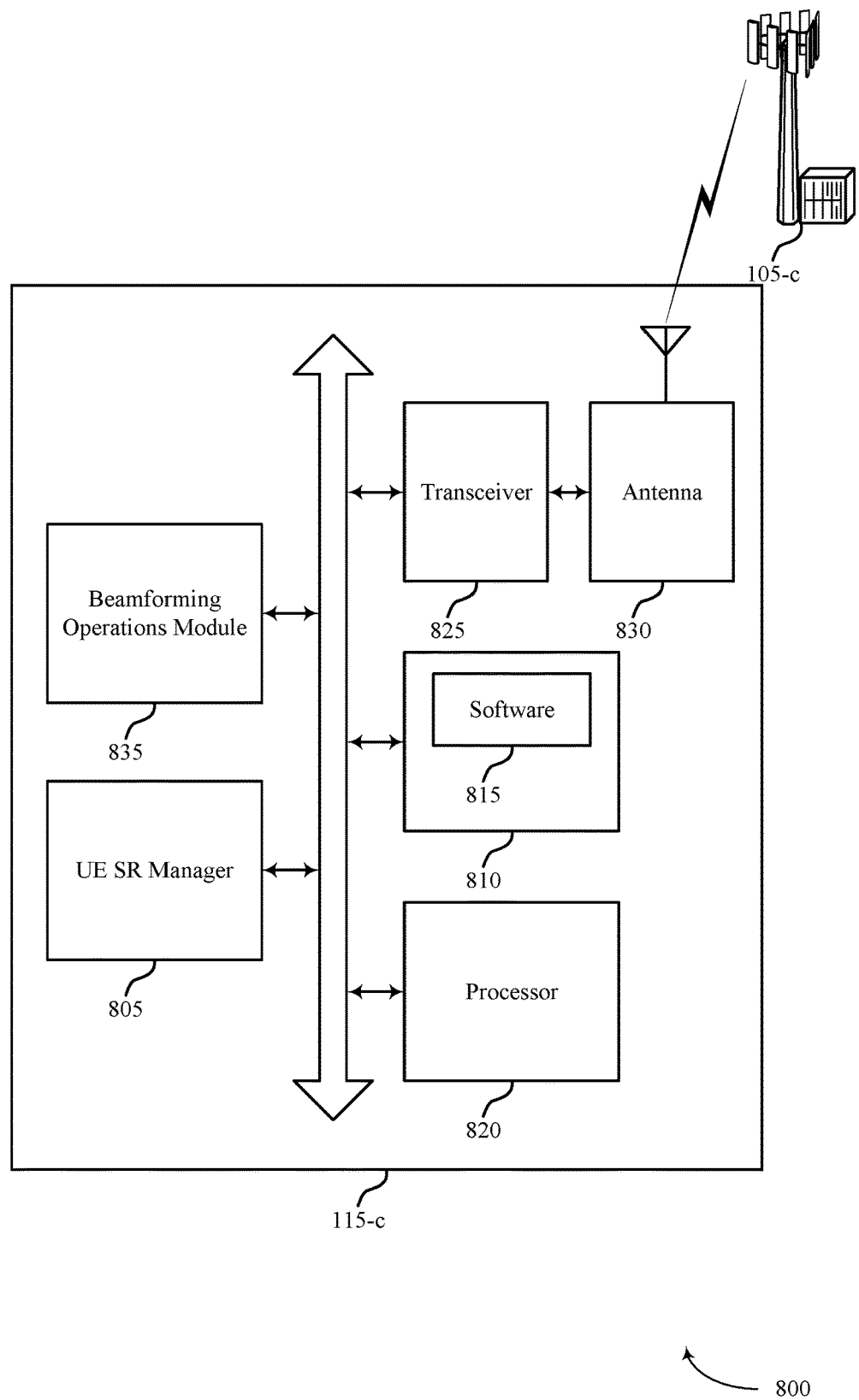
FIG. 8 illustrates a block diagram of a system including a UE that supports scheduling request transmission to request resources for, for example, a BSR in accordance with aspects of the present disclosure.

FIG. 8 shows a diagram of a system 800 including a device that supports scheduling request transmission to request resources for a BSR in accordance with various aspects of the present disclosure. For example, system 800 may include UE 115-c, which may be an example of a wireless device 500, a wireless device 600, or a UE 115 as described with reference to FIGS. 1, 2 and 5 through 7.

UE 115-c may also include UE SR manager 805, memory 810, processor 820, transceiver 825, antenna 830 and beam-forming operations module 835. Each of these modules may communicate, directly or indirectly, with one another (e.g., via one or more buses). The UE SR manager 805 may be an example of a UE SR manager as described with reference to FIGS. 5 through 7.

The memory 810 may include random access memory (RAM) and read only memory (ROM). The memory 810 may store computer-readable, computer-executable software including instructions that, when executed, cause the processor to perform various functions described herein (e.g., scheduling request transmission to request resources for a BSR, etc.). In some cases, the software 815 may not be directly executable by the processor but may cause a computer (e.g., when compiled and executed) to perform functions described herein. The processor 820 may include an intelligent hardware device, (e.g., a central processing unit (CPU), a microcontroller, an application specific integrated circuit (ASIC), etc.)

The transceiver 825 may communicate bi-directionally, via one or more antennas, wired, or wireless links, with one or more networks, as described above. For example, the transceiver 825 may communicate bi-directionally with a base station 105 or a UE 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions.

Beamforming operations module 835 may enable UE 115-*c* to send and receive transmissions using beamforming techniques (i.e., directional transmissions using an array of antennas).

Figure 9:
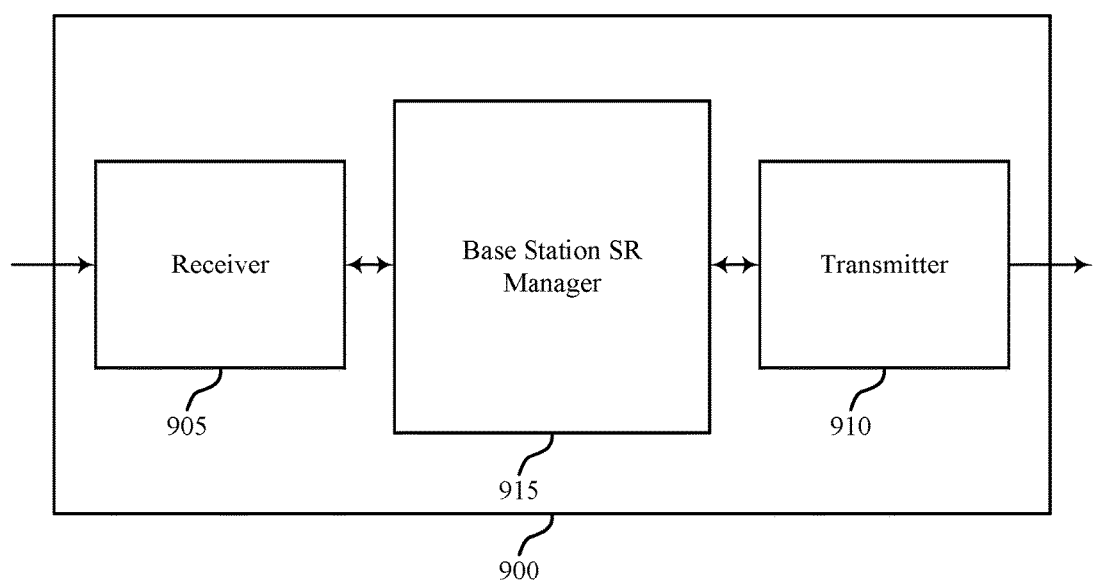
FIGS. 9 through 11 show block diagrams of a wireless device that supports scheduling request transmission to request resources for, for example, a BSR in accordance with aspects of the present disclosure.

FIG. 9 shows a block diagram of a wireless device 900 that supports scheduling request transmission to request resources for a BSR in accordance with various aspects of the present disclosure. Wireless device 900 may be an example of aspects of a base station 105 described with reference to FIGS. 1 and 2. Wireless device 900 may include receiver 905, transmitter 910 and base station SR manager 915. Wireless device 900 may also include a processor. Each of these components may be in communication with each other.

The receiver 905 may receive information such as packets, user data, or control information associated with various information channels (e.g., control channels, data channels, and information related to scheduling request transmission to request resources for a BSR, etc.). Information may be passed on to other components of the device. The receiver 905 may be an example of aspects of the transceiver 1225 described with reference to FIG. 12.

The transmitter 910 may transmit signals received from other components of wireless device 900. In some examples, the transmitter 910 may be collocated with a receiver in a transceiver module. For example, the transmitter 910 may be an example of aspects of the transceiver 1225 described with reference to FIG. 12. The transmitter 910 may include a single antenna, or it may include a plurality of antennas.

The base station SR manager 915 may receive a scheduling request from a UE during a time period selected by the UE based at least in part on the directional synchronization subframe, transmit a grant for transmitting a BSR in response to the scheduling request, and receive the BSR from the UE using resources indicated in the grant. In some examples, the time period may be associated with a RACH. The base station SR manager 915 may also be an example of aspects of the base station SR manager 1205 described with reference to FIG. 12.

Figure 10:
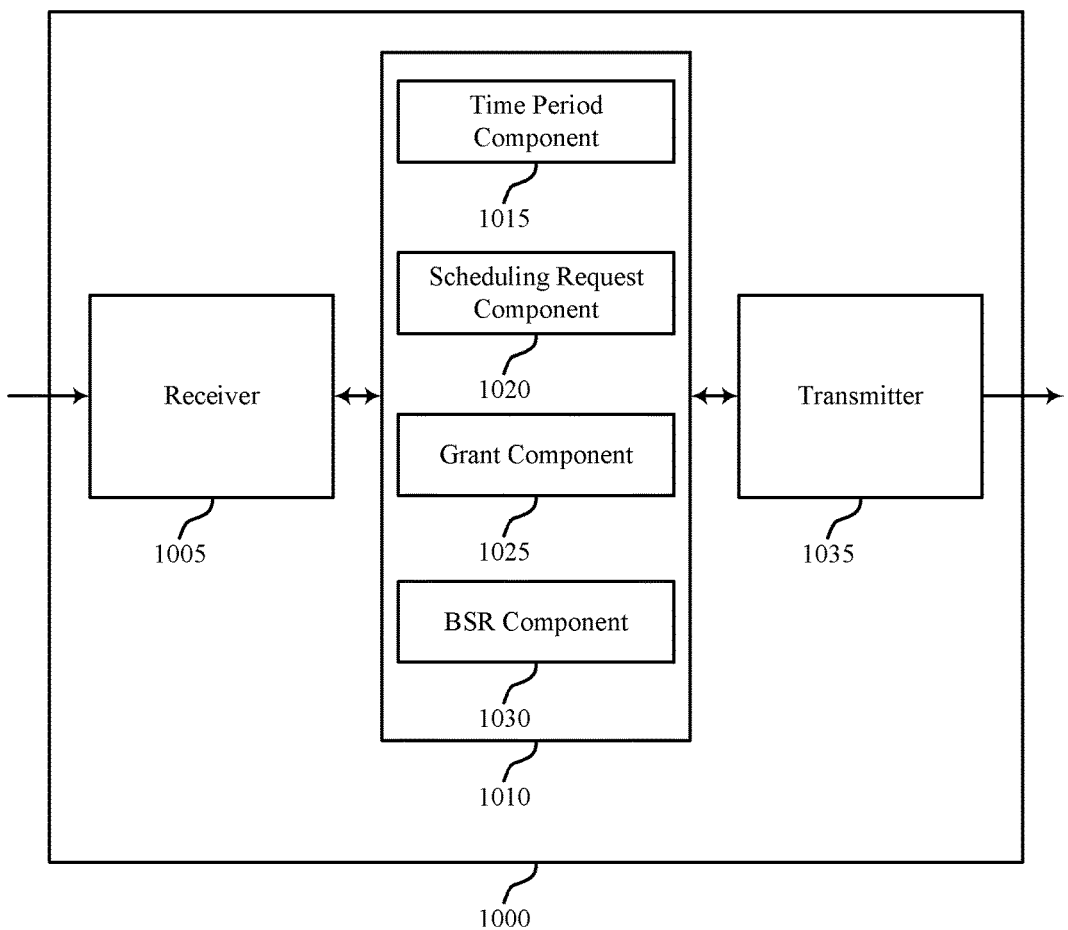

FIG. 10 shows a block diagram of a wireless device 1000 that supports scheduling request transmission to request resources for a BSR in accordance with various aspects of the present disclosure. Wireless device 1000 may be an example of aspects of a wireless device 900 or a base station 105 described with reference to FIGS. 1, 2 and 9. Wireless device 1000 may include receiver 1005, base station SR manager 1010 and transmitter 1035. Wireless device 1000 may also include a processor. Each of these components may be in communication with each other.

The receiver 1005 may receive information which may be passed on to other components of the device. The receiver 1005 may also perform the functions described with reference to the receiver 905 of FIG. 9. The receiver 1005 may be an example of aspects of the transceiver 1225 described with reference to FIG. 12.

The base station SR manager 1010 may be an example of aspects of base station SR manager 915 described with reference to FIG. 9. The base station SR manager 1010 may include time period component 1015, scheduling request component 1020, grant component 1025 and BSR component 1030. The base station SR manager 1010 may be an example of aspects of the base station SR manager 1205 described with reference to FIG. 12.

The time period component 1015 may identify a time period for receiving a scheduling request selected by a UE based on receiving a directional synchronization subframe. In some examples, the time period may be associated with a RACH. The scheduling request component 1020 may receive the scheduling request from the UE during the time period. In some cases, the scheduling request includes a sequence repeated a set of times over a set of symbol periods.

The grant component 1025 may transmit a grant for transmitting a BSR in response to the scheduling request. In some cases, the resources indicated in the grant includes PUSCH resources, PUCCH resources, or both. The BSR component 1030 may receive the BSR from the UE using resources indicated in the grant.

The transmitter 1035 may transmit signals received from other components of wireless device 1000. In some examples, the transmitter 1035 may be collocated with a receiver in a transceiver module. For example, the transmitter 1035 may be an example of aspects of the transceiver 1225 described with reference to FIG. 12. The transmitter 1035 may utilize a single antenna, or it may utilize a plurality of antennas.

Figure 11:
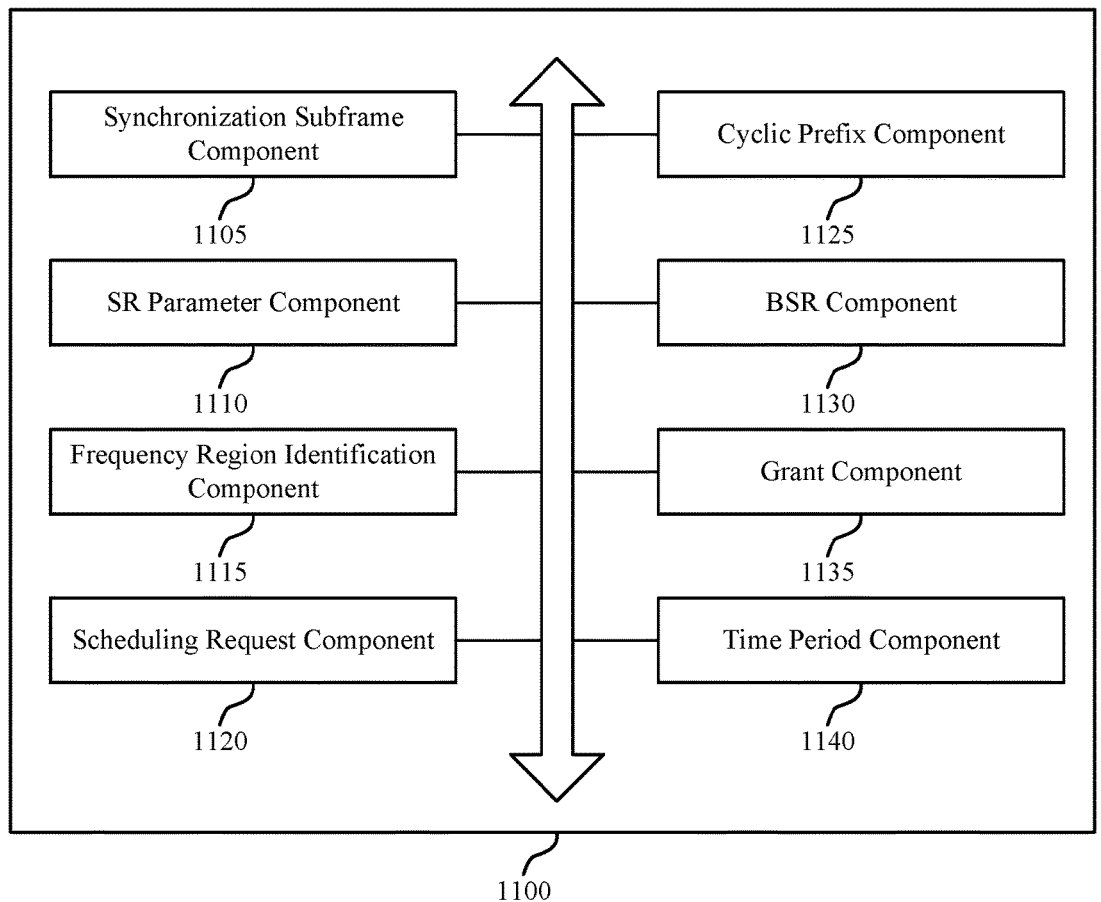

FIG. 11 shows a block diagram of a base station SR manager 1100 which may be an example of the corresponding component of wireless device 900 or wireless device 1000. That is, base station SR manager 1100 may be an example of aspects of base station SR manager 915 or base station SR manager 1010 described with reference to FIGS. 9 and 10. The base station SR manager 1100 may also be an example of aspects of the base station SR manager 1205 described with reference to FIG. 12.

The base station SR manager 1100 may include synchronization subframe component 1105, SR parameter component 1110, frequency region identification component 1115, scheduling request component 1120, cyclic prefix component 1125, BSR component 1130, grant component 1135 and time period component 1140. Each of these modules may communicate, directly or indirectly, with one another (e.g., via one or more buses).

The synchronization subframe component 1105 may transmit a directional synchronization subframe to the UE, where the time period is associated with the received directional synchronization subframe.

The SR parameter component 1110 may transmit an indication of at least one of a cyclic shift, a set of subcarriers, or a sequence index to the UE, where the scheduling request is received using the cyclic shift, the set of subcarriers, the sequence index, or combinations thereof.

The frequency region identification component 1115 may identify a frequency region associated with the RACH and a frequency region associated with scheduling requests that does not overlap with the frequency region associated with the RACH, where the scheduling request is received using resources located within the frequency region associated with scheduling requests.

The scheduling request component 1120 may receive a scheduling request from a UE during the time period. In some cases, the scheduling request includes a sequence repeated a set of times over a set of symbol periods.

The cyclic prefix component 1125 may identify a cyclic prefix length for the scheduling request, where the cyclic prefix length includes a long cyclic prefix length associated with the RACH or a short cyclic prefix length associated with non-RACH transmissions.

The BSR component 1130 may receive the BSR from the UE using resources indicated in the grant. The grant component 1135 may transmit a grant for transmitting a BSR in response to the scheduling request. In some cases, the resources indicated in the grant includes PUSCH resources, PUCCH resources, or both. The time period component 1140 may identify a time period for receiving a scheduling request selected by the UE based on a directional synchronization subframe. In some examples, the time period may be associated with a RACH.

Figure 12:
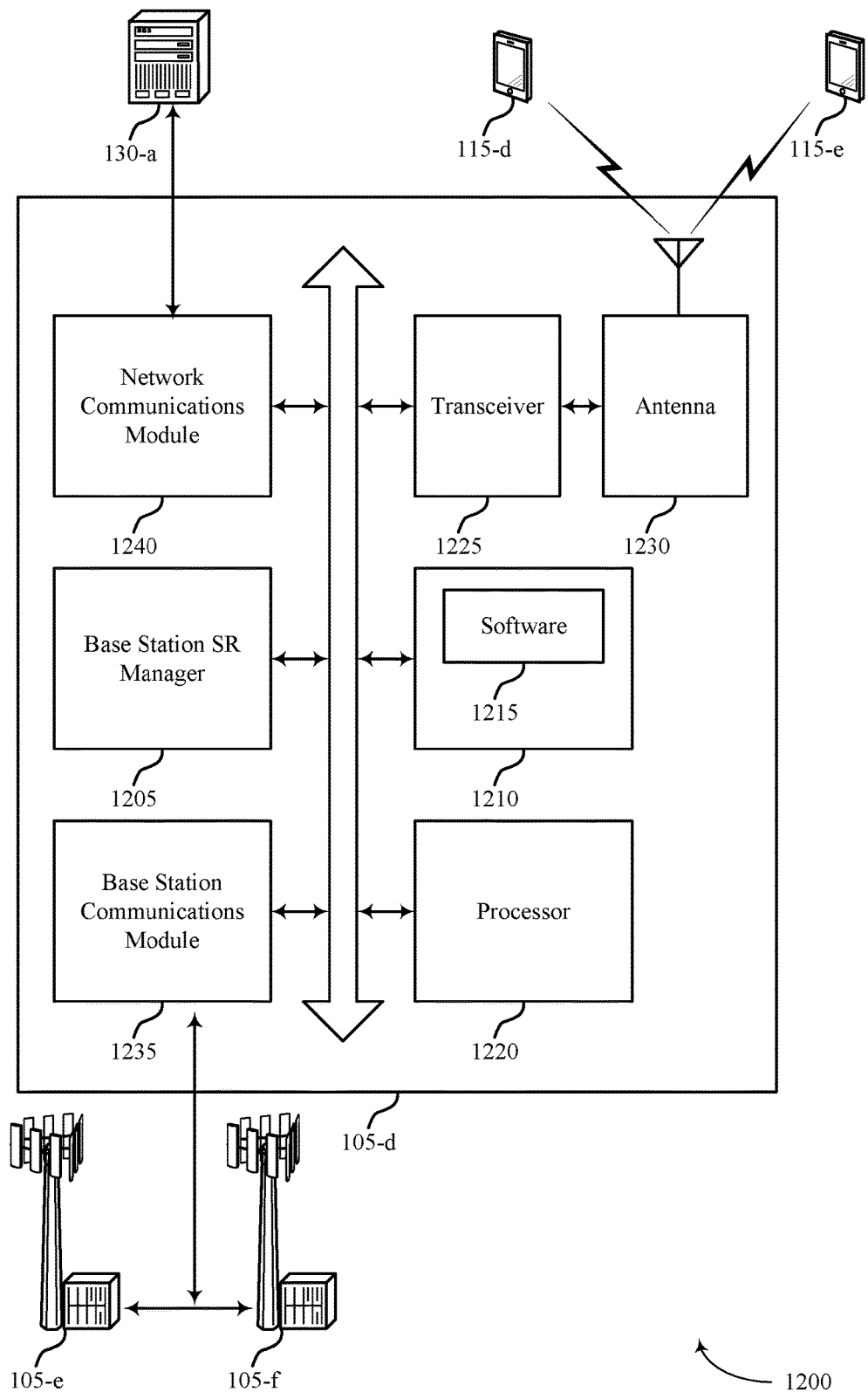
FIG. 12 illustrates a block diagram of a system including a base station that supports scheduling request transmission to request resources for, for example, a BSR in accordance with aspects of the present disclosure.

FIG. 12 shows a diagram of a wireless system 1200 including a device configured that supports scheduling request transmission to request resources for a BSR in accordance with various aspects of the present disclosure. For example, system 1200 may include base station 105-d, which may be an example of a wireless device 900, a wireless device 1000, or a base station 105 as described with reference to FIGS. 1, 2 and 9 through 11. Base station 105-d may also include components for bi-directional voice and data communications including components for transmitting communications and components for receiving communications. For example, base station 105-d may communicate bi-directionally with one or more UEs 115.

Base station 105-d may also include base station SR manager 1205, memory 1210, processor 1220, transceiver 1225, antenna 1230, base station communications module 1235 and network communications module 1240. Each of these modules may communicate, directly or indirectly, with one another (e.g., via one or more buses). The base station SR manager 1205 may be an example of a base station SR manager as described with reference to FIGS. 9 through 11.

The memory 1210 may include RAM and ROM. The memory 1210 may store computer-readable, computer-executable software including instructions that, when executed, cause the processor to perform various functions described herein (e.g., scheduling request transmission to request resources for a BSR, etc.). In some cases, the software 1215 may not be directly executable by the processor but may cause a computer (e.g., when compiled and executed) to perform functions described herein. The processor 1220 may include an intelligent hardware device, (e.g., a CPU, a microcontroller, an ASIC, etc.)

The transceiver 1225 may communicate bi-directionally, via one or more antennas, wired, or wireless links, with one or more networks, as described above. For example, the transceiver 1225 may communicate bi-directionally with a base station 105 or a UE 115. The transceiver 1225 may also include a modem to modulate the packets and provide the modulated packets to the antennas for transmission, and to demodulate packets received from the antennas. In some cases, the wireless device may include a single antenna 1230. However, in some cases the device may have more than one antenna 830, which may be capable of concurrently transmitting or receiving multiple wireless transmissions.

The base station communications module 1235 may manage communications with other base station 105, and may include a controller or scheduler for controlling communications with UEs 115 in cooperation with other base stations 105. For example, the base station communications module 1235 may coordinate scheduling for transmissions to UEs 115 for various interference mitigation techniques such as beamforming or joint transmission. In some examples, base station communications module-95 may provide an X2 interface within an LTE/LTE-A wireless communication network technology to provide communication between base stations 105.

The network communications module 1240 may manage communications with the core network (e.g., via one or more wired backhaul links). For example, the network communications module 1240 may manage the transfer of data communications for client devices, such as one or more UEs 115.

Figure 13:
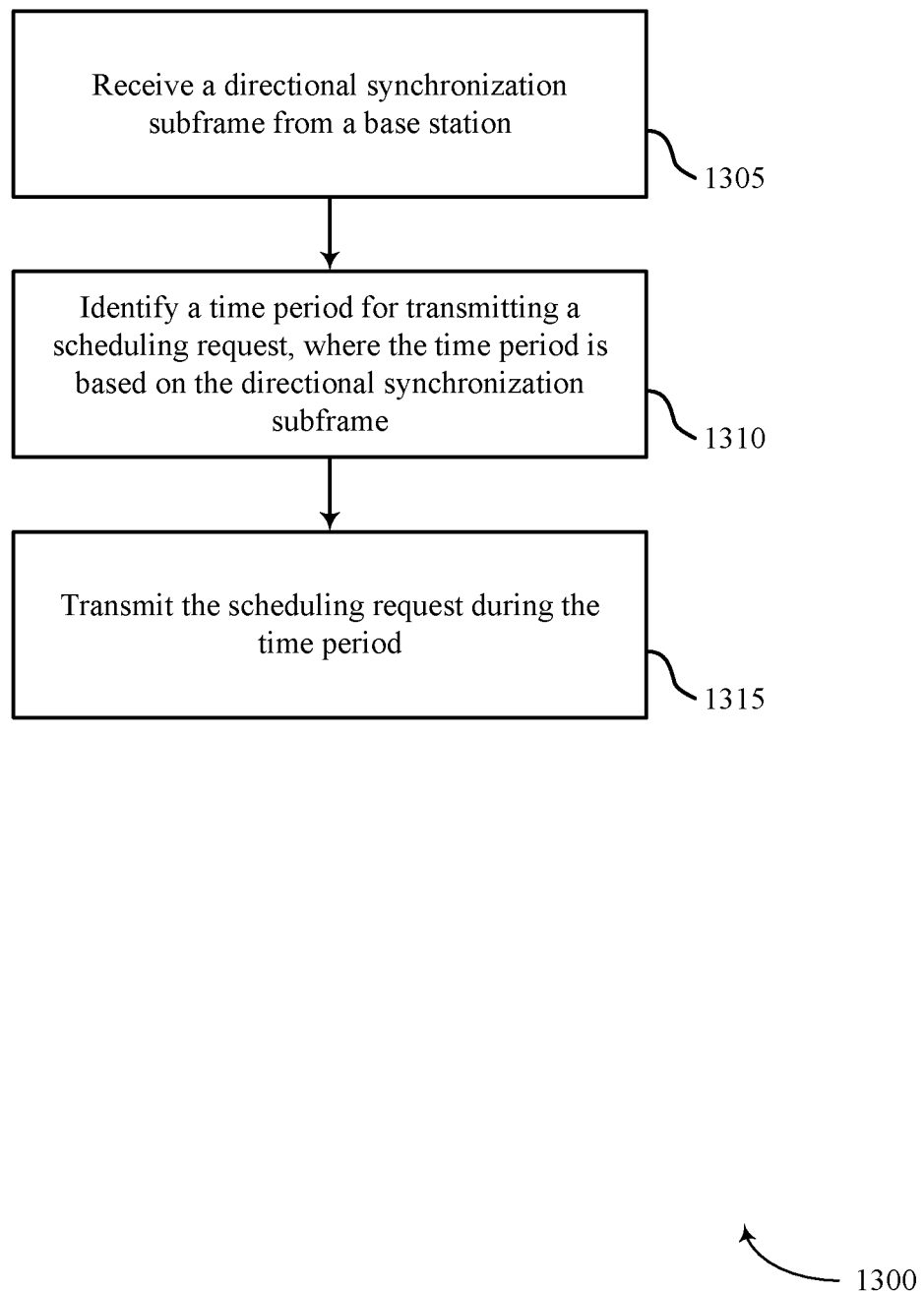
FIGS. 13 through 18 illustrate methods for scheduling request transmission to request resources for, for example, a BSR in accordance with aspects of the present disclosure.

FIG. 13 shows a flowchart illustrating a method 1300 for scheduling request transmission based on a directional synchronization subframe in accordance with various aspects of the present disclosure. The operations of method 1300 may be implemented by a device such as a UE 115 or its components as described with reference to FIGS. 1 and 2. For example, the operations of method 1300 may be performed by the UE SR manager as described herein. In some examples, the UE 115 may execute a set of codes to control the functional elements of the device to perform the functions described below. Additionally or alternatively, the UE 115 may perform aspects the functions described below using special-purpose hardware.

At block 1305, the UE 115 may receive a directional synchronization subframe from a base station as described above with reference to FIGS. 2 through 4. In certain examples, the operations of block 1305 may be performed by the synchronization subframe component as described with reference to FIGS. 6 and 7.

At block 1310, the UE 115 may identify a time period for transmitting a scheduling request as described above with reference to FIGS. 2 through 4. In certain examples, the operations of block 1310 may be performed by the time period component as described with reference to FIGS. 6 and 7.

At block 1315, the UE 115 may transmit a scheduling request to a base station during the time period as described above with reference to FIGS. 2 through 4. In certain examples, the operations of block 1315 may be performed by the scheduling request component as described with reference to FIGS. 6 and 7.

Figure 14:
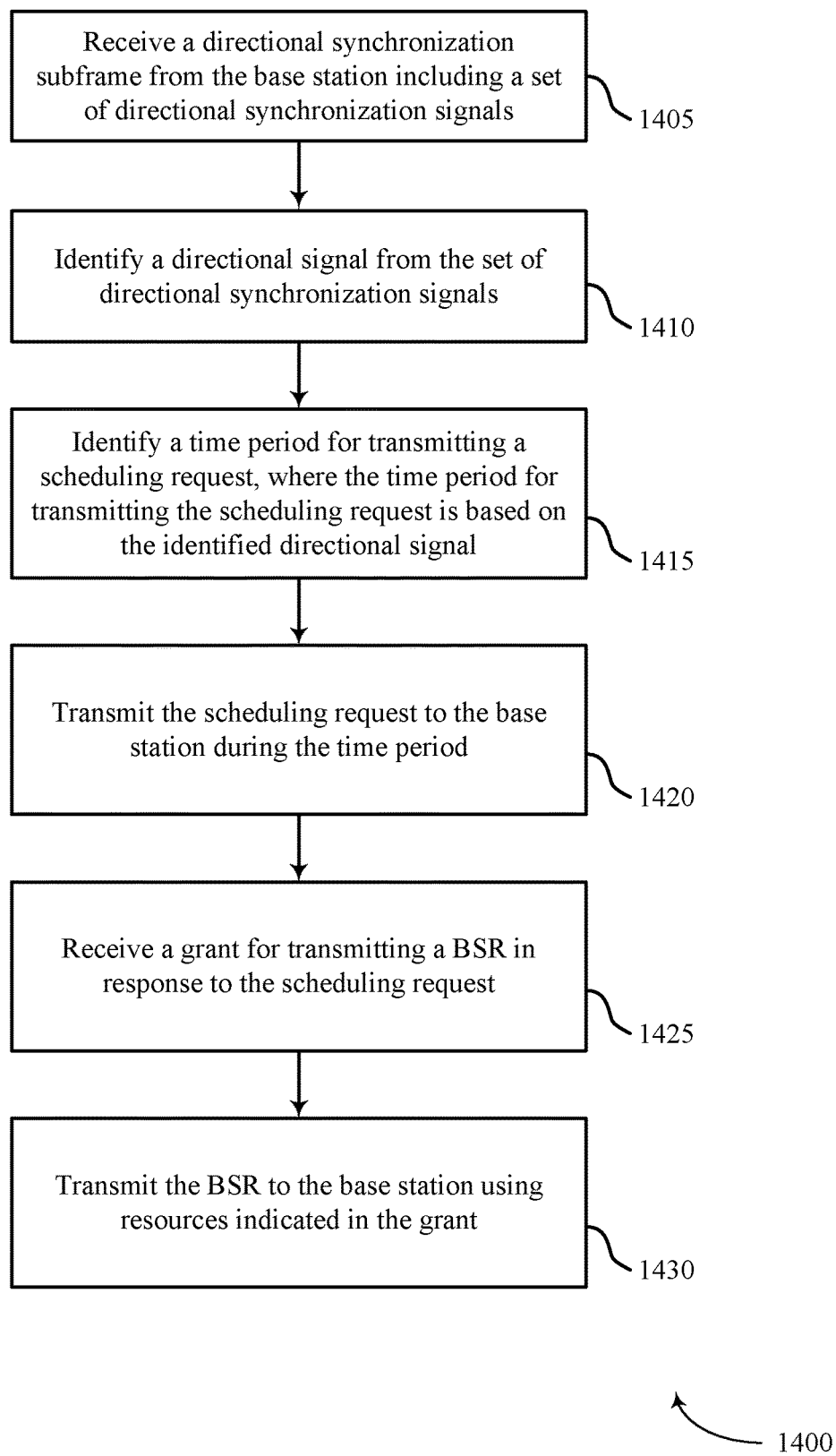

FIG. 14 shows a flowchart illustrating a method 1400 for scheduling request transmission to request resources for a BSR in accordance with various aspects of the present disclosure. The operations of method 1400 may be implemented by a device such as a UE 115 or its components as described with reference to FIGS. 1 and 2. For example, the operations of method 1400 may be performed by the UE SR manager as described herein. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may receive a directional synchronization subframe from the base station as described above with reference to FIGS. 2 through 4. In some examples, the directional synchronization subframe may include a set of directional synchronization signals. In certain examples, the operations of block 1405 may be performed by the synchronization subframe component as described with reference to FIGS. 6 and 7.

At block 1410, the UE 115 may identify a directional signal from the set of directional synchronization signals as described above with reference to FIGS. 2 through 4. In certain examples, the operations of block 1410 may be performed by the synchronization subframe component as described with reference to FIGS. 6 and 7.

At block 1415, the UE 115 may identify a time period for transmitting a scheduling request, where the time period for transmitting the scheduling request is based on the identified directional signal as described above with reference to FIGS. 2 through 4. In certain examples, the operations of block 1415 may be performed by the time period component as described with reference to FIGS. 6 and 7.

At block 1420, the UE 115 may transmit a scheduling request to a base station during the time period for transmitting the scheduling request as described above with reference to FIGS. 2 through 4. In certain examples, the operations of block 1420 may be performed by the scheduling request component as described with reference to FIGS. 6 and 7.

At block 1425, the UE 115 may receive a grant for transmitting a BSR in response to the scheduling request as described above with reference to FIGS. 2 through 4. In certain examples, the operations of block 1425 may be performed by the grant component as described with reference to FIGS. 6 and 7.

At block 1430, the UE 115 may transmit the BSR to the base station using resources indicated in the grant as described above with reference to FIGS. 2 through 4. In certain examples, the operations of block 1430 may be performed by the BSR component as described with reference to FIGS. 6 and 7.

Figure 15:
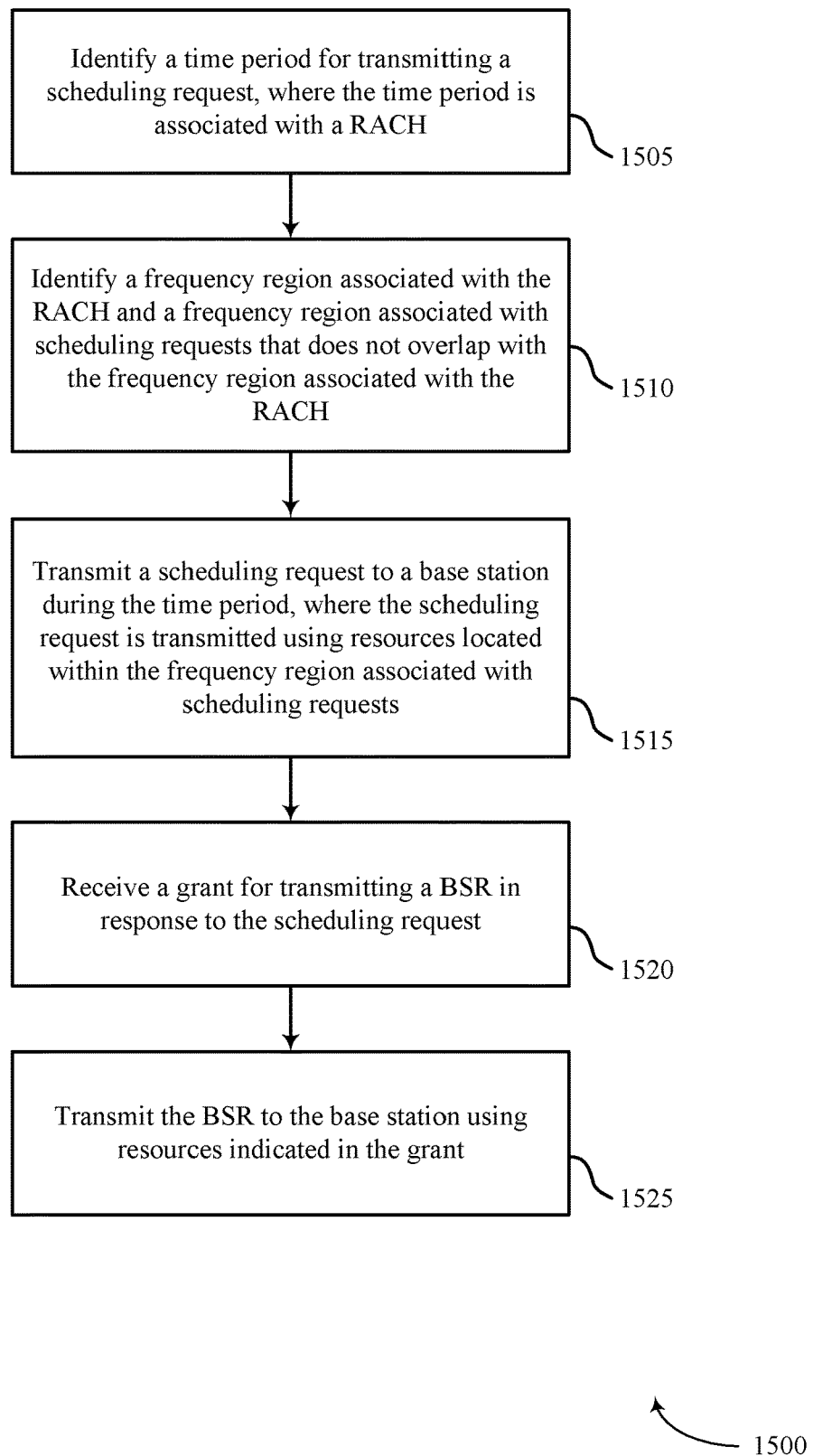

FIG. 15 shows a flowchart illustrating a method 1500 for scheduling request transmission to request resources for a BSR in accordance with various aspects of the present disclosure. The operations of method 1500 may be implemented by a device such as a UE 115 or its components as described with reference to FIGS. 1 and 2. For example, the operations of method 1500 may be performed by the UE SR manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may identify a time period for transmitting a scheduling request, where the time period is associated with a RACH as described above with reference to FIGS. 2 through 4. In certain examples, the operations of block 1505 may be performed by the time period component as described with reference to FIGS. 6 and 7.

At block 1510, the UE 115 may identify a frequency region associated with the RACH and a frequency region associated with scheduling requests that does not overlap with the frequency region associated with the RACH as described above with reference to FIGS. 2 through 4. In certain examples, the operations of block 1510 may be performed by the frequency region identification component as described with reference to FIGS. 6 and 7.

At block 1515, the UE 115 may transmit a scheduling request to a base station during the time period, where the scheduling request is transmitted using resources located within the frequency region associated with scheduling requests as described above with reference to FIGS. 2 through 4. In certain examples, the operations of block 1515 may be performed by the scheduling request component as described with reference to FIGS. 6 and 7.

At block 1520, the UE 115 may receive a grant for transmitting a BSR in response to the scheduling request as described above with reference to FIGS. 2 through 4. In certain examples, the operations of block 1520 may be performed by the grant component as described with reference to FIGS. 6 and 7.

At block 1525, the UE 115 may transmit the BSR to the base station using resources indicated in the grant as described above with reference to FIGS. 2 through 4. In certain examples, the operations of block 1525 may be performed by the BSR component as described with reference to FIGS. 6 and 7.

Figure 16:
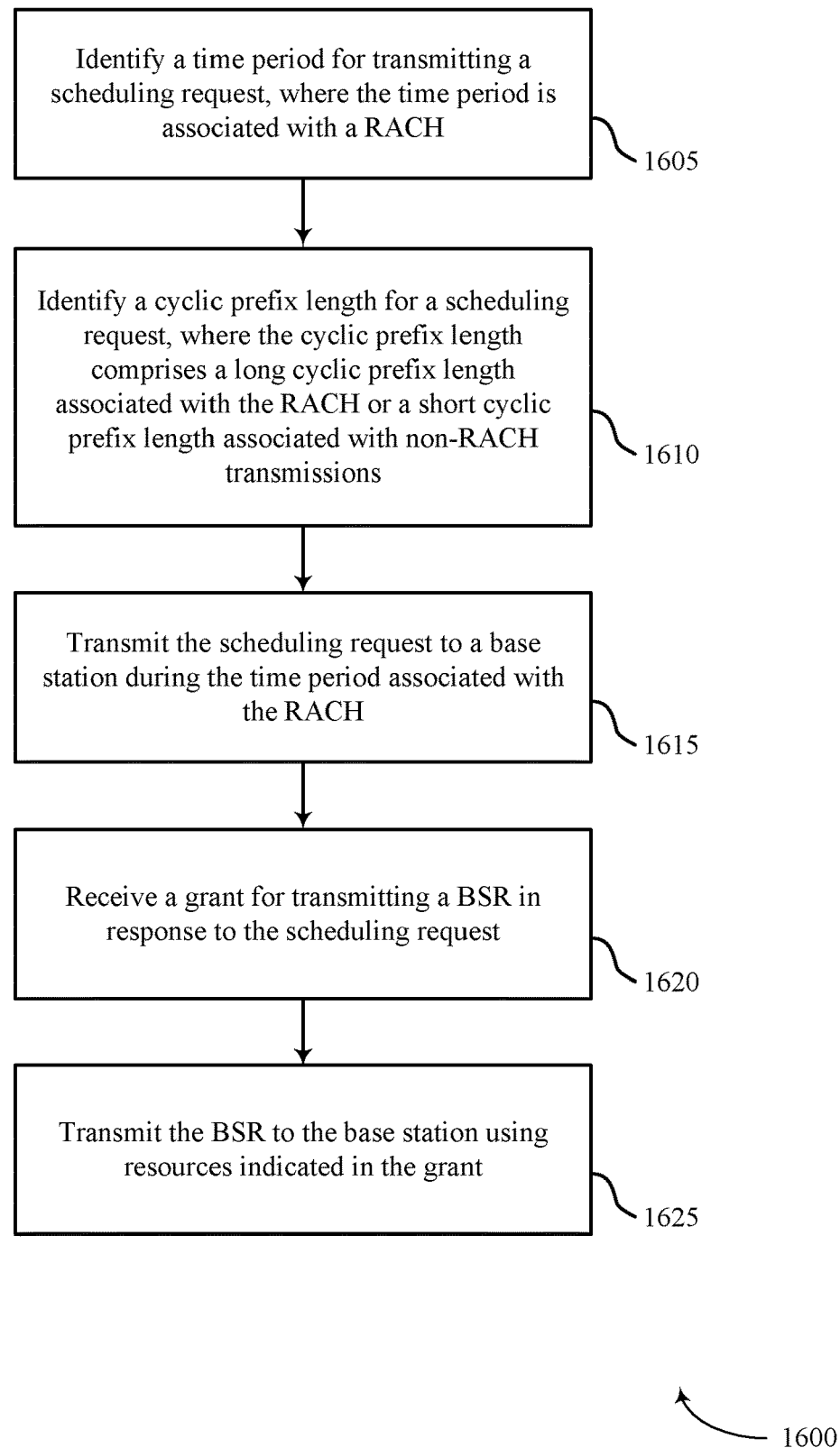

FIG. 16 shows a flowchart illustrating a method 1600 for scheduling request transmission to request resources for a BSR in accordance with various aspects of the present disclosure. The operations of method 1600 may be implemented by a device such as a UE 115 or its components as described with reference to FIGS. 1 and 2. For example, the operations of method 1600 may be performed by the UE SR manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may identify a time period for transmitting a scheduling request, where the time period is associated with a RACH as described above with reference to FIGS. 2 through 4. In certain examples, the operations of block 1605 may be performed by the time period component as described with reference to FIGS. 6 and 7.

At block 1610, the UE 115 may identify a cyclic prefix length for a scheduling request, where the cyclic prefix length includes a long cyclic prefix length associated with the RACH or a short cyclic prefix length associated with non-RACH transmissions as described above with reference to FIGS. 2 through 4. In certain examples, the operations of block 1610 may be performed by the cyclic prefix component as described with reference to FIGS. 6 and 7.

At block 1615, the UE 115 may transmit the scheduling request to a base station during the time period as described above with reference to FIGS. 2 through 4. In certain examples, the operations of block 1615 may be performed by the scheduling request component as described with reference to FIGS. 6 and 7.

At block 1620, the UE 115 may receive a grant for transmitting a BSR in response to the scheduling request as described above with reference to FIGS. 2 through 4. In certain examples, the operations of block 1620 may be performed by the grant component as described with reference to FIGS. 6 and 7.

At block 1625, the UE 115 may transmit the BSR to the base station using resources indicated in the grant as described above with reference to FIGS. 2 through 4. In certain examples, the operations of block 1625 may be performed by the BSR component as described with reference to FIGS. 6 and 7.

Figure 17:
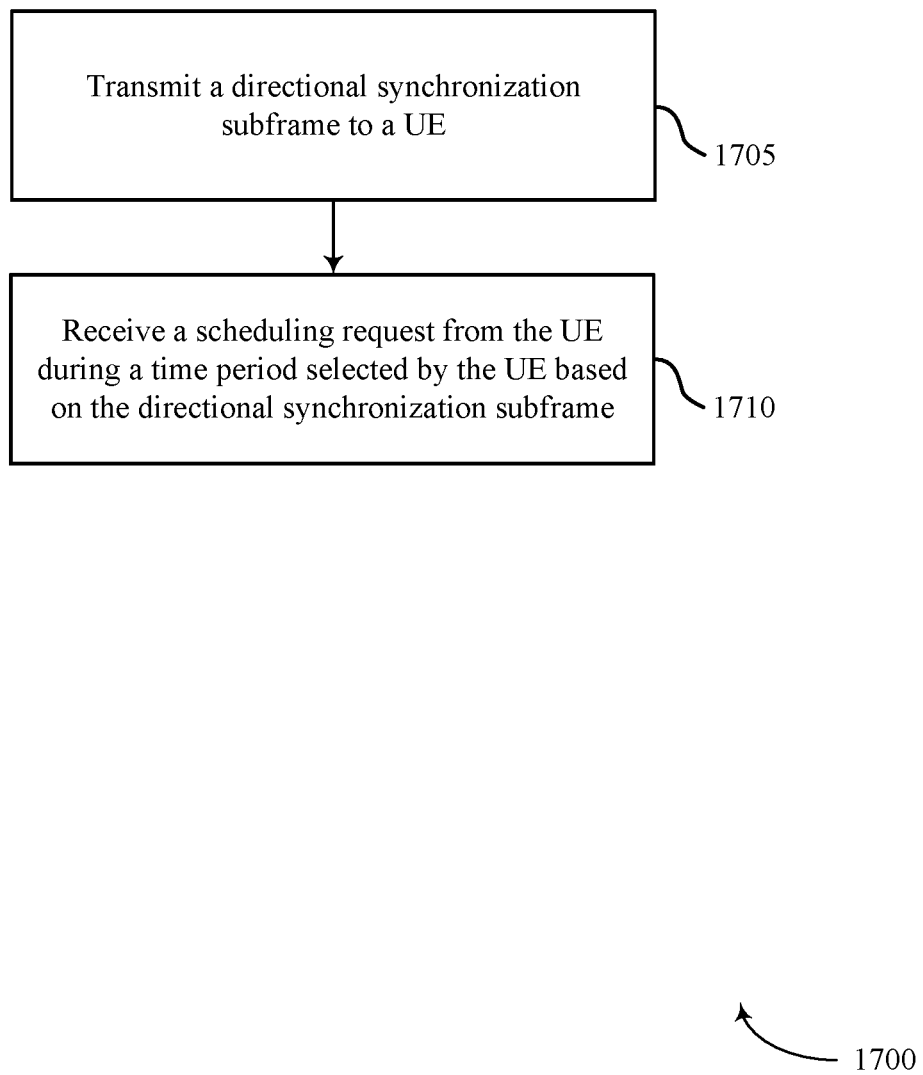

FIG. 17 shows a flowchart illustrating a method 1700 for scheduling request transmission to request resources for a BSR in accordance with various aspects of the present disclosure. The operations of method 1700 may be implemented by a device such as a base station 105 or its components as described with reference to FIGS. 1 and 2. For example, the operations of method 1700 may be performed by the base station SR manager as described herein. In some examples, the base station 105 may execute a set of codes to control the functional elements of the device to perform the functions described below. Additionally or alternatively, the base station 105 may perform aspects the functions described below using special-purpose hardware.

At block 1705, the base station 105 may transmit a directional synchronization subframe to a UE as described above with reference to FIGS. 2 through 4. In certain examples, the operations of block 1705 may be performed by the synchronization subframe component as described with reference to FIGS. 10 and 11

At block 1710, the base station 105 may receive a scheduling request from the UE during a time period selected by the UE based on the directional synchronization subframe as described above with reference to FIGS. 2 through 4. In certain examples, the operations of block 1710 may be performed by the scheduling request component as described with reference to FIGS. 10 and 11.

Figure 18:
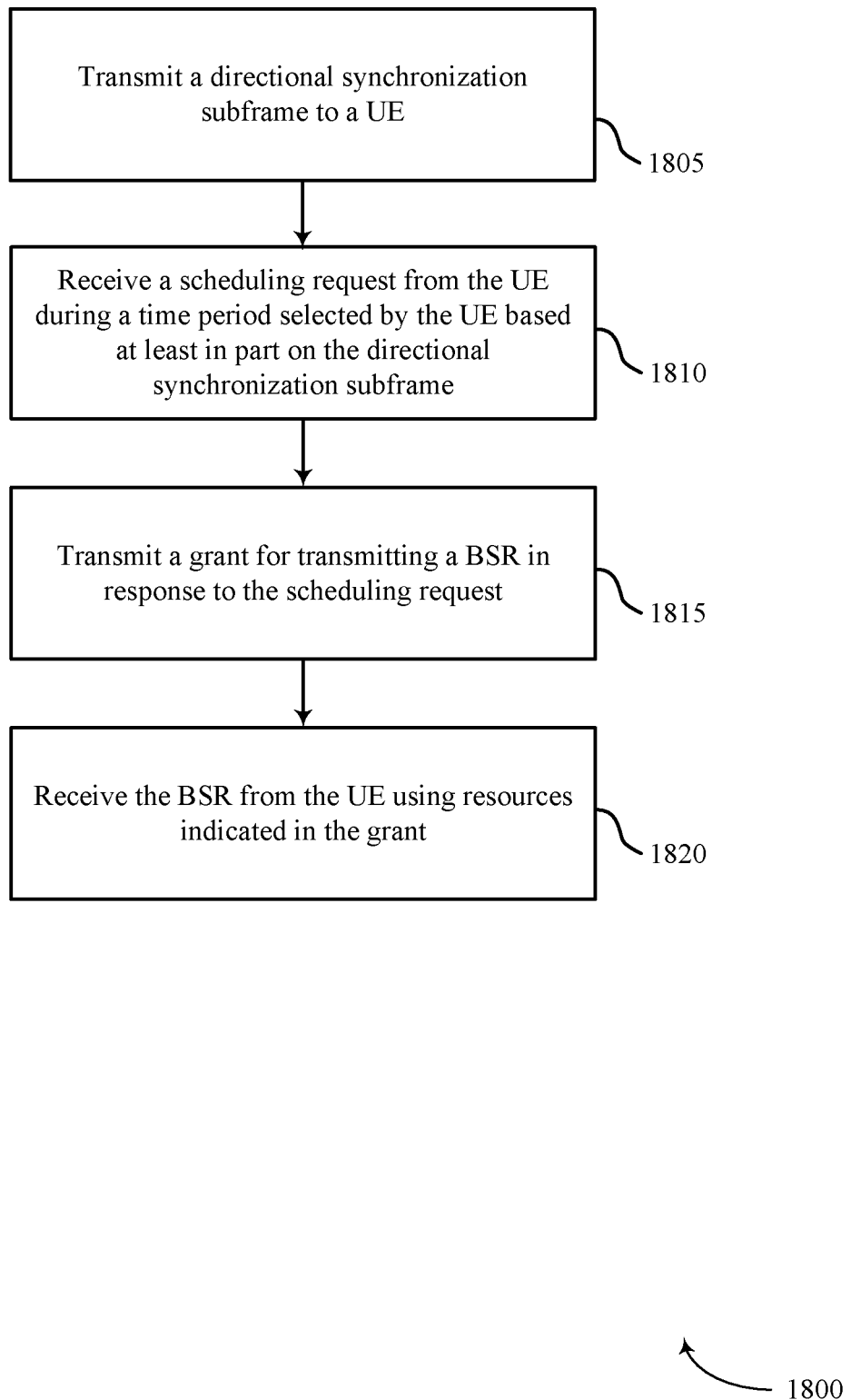

FIG. 18 shows a flowchart illustrating a method 1800 for scheduling request transmission to request resources for a BSR in accordance with various aspects of the present disclosure. The operations of method 1800 may be implemented by a device such as a base station 105 or its components as described with reference to FIGS. 1 and 2. For example, the operations of method 1800 may be performed by the base station SR manager as described herein. In some examples, the base station 105 may execute a set of codes to control the functional elements of the device to perform the functions described below. Additionally or alternatively, the base station 105 may perform aspects the functions described below using special-purpose hardware.

At block 1805, the base station 105 may transmit a directional synchronization subframe to a UE as described above with reference to FIGS. 2 through 4. In certain examples, the operations of block 1805 may be performed by the synchronization subframe component as described with reference to FIGS. 10 and 11

At block 1810, the base station 105 may receive a scheduling request from a UE during the time period as described above with reference to FIGS. 2 through 4. In certain examples, the operations of block 1810 may be performed by the scheduling request component as described with reference to FIGS. 10 and 11.

At block 1815, the base station 105 may transmit a grant for transmitting a BSR in response to the scheduling request as described above with reference to FIGS. 2 through 4. In certain examples, the operations of block 1815 may be performed by the grant component as described with reference to FIGS. 10 and 11.

At block 1820, the base station 105 may receive the BSR from the UE using resources indicated in the grant as described above with reference to FIGS. 2 through 4. In certain examples, the operations of block 1820 may be performed by the BSR component as described with reference to FIGS. 10 and 11.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for scheduling request transmission to request resources for a BSR.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different (physical) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for scheduling request transmission to request resources for a BSR. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method for wireless communication at a user equipment (UE), comprising:
receiving a directional synchronization subframe comprising a set of directional synchronization signals from a base station;
identifying a scheduling request for transmission to the base station;
identifying a set of time resources for a random access procedure based at least in part on a directional synchronization signal of the set of directional synchronization signals;
transmitting a random access message to the base station during the set of time resources based at least in part on the identified scheduling request;
receiving a grant to transmit a buffer status report (BSR) based at least in part on the scheduling request; and
transmitting the BSR to the base station using resources indicated in the grant.

2. The method of claim 1, wherein the resources indicated in the grant comprise physical uplink shared channel (PUSCH) resources, physical uplink control channel (PUCCH) resources, or both.

3. The method of claim 1, further comprising:
identifying the directional synchronization signal from the set of directional synchronization signals.

4. The method of claim 1, wherein the set of directional synchronization signals comprises a primary synchronization signal, a secondary synchronization signal, a beam reference signal, or any combination thereof.

5. The method of claim 1, further comprising:
receiving an indication of at least one of a cyclic shift, a set of subcarriers, or a sequence index for the scheduling request from the base station.

6. The method of claim 1, wherein the scheduling request comprises a sequence repeated a plurality of times over a plurality of symbol periods.

7. The method of claim 1, wherein the set of time resources for transmitting the random access message is associated with a random access channel (RACH).

8. The method of claim 7, further comprising:
identifying a frequency region associated with the RACH and a frequency region associated with scheduling requests that does not overlap with the frequency region associated with the RACH, wherein the scheduling request is transmitted using resources located within the frequency region associated with scheduling requests.

9. The method of claim 7, further comprising:
identifying a cyclic prefix length for the scheduling request, wherein the cyclic prefix length comprises a long cyclic prefix length associated with the RACH or a short cyclic prefix length associated with non-RACH transmissions.

10. A method for wireless communication at a base station, comprising:
transmitting a directional synchronization subframe comprising a set of directional synchronization signals to a user equipment (UE);
receiving a random access message from the UE during a set of time resources selected by the UE based at least in part on a directional synchronization signal of the set of directional synchronization signals and a scheduling request at the UE;
transmitting a grant for transmitting a buffer status report (BSR) based at least in part on the random access message; and
receiving the BSR from the UE using resources indicated in the grant.

11. The method of claim 10, wherein the resources indicated in the grant comprises physical uplink shared channel (PUSCH) resources, physical uplink control channel (PUCCH) resources, or both.

12. The method of claim 10, wherein the set of time resources for receiving the random access message is associated with a random access channel (RACH).

13. The method of claim 12, further comprising:
identifying a frequency region associated with the RACH and a frequency region associated with scheduling requests that does not overlap with the frequency region associated with the RACH, wherein the scheduling request is received using resources located within the frequency region associated with scheduling requests.

14. The method of claim 12, further comprising:
identifying a cyclic prefix length for the scheduling request, wherein the cyclic prefix length comprises a long cyclic prefix length associated with the RACH or a short cyclic prefix length associated with non-RACH transmissions.

15. The method of claim 10, further comprising:
transmitting an indication of at least one of a cyclic shift, a set of subcarriers, or a sequence index for the scheduling request to the UE.

16. The method of claim 10, wherein the scheduling request comprises a sequence repeated a plurality of times over a plurality of symbol periods.

17. An apparatus for wireless communication at a user equipment (UE), comprising:
means for receiving a directional synchronization subframe comprising a set of directional synchronization signals from a base station;
means for identifying a scheduling request for transmission to the base station;
means for identifying a set of time resources for a random access procedure based at least in part on a directional synchronization signal of the set of directional synchronization signals;
means for transmitting a random access message to the base station during the set of time resources based at least in part on the identified scheduling request;
means for receiving a grant to transmit a buffer status report (BSR) based at least in part on the scheduling request; and
means for transmitting the BSR to the base station using resources indicated in the grant.

18. The apparatus of claim 17, wherein the resources indicated in the grant comprise physical uplink shared channel (PUSCH) resources, physical uplink control channel (PUCCH) resources, or both.

19. The apparatus of claim 17, further comprising:
means for identifying the directional synchronization from the set of directional synchronization signals.

20. The apparatus of claim 17, wherein each set of directional synchronization signals comprises a primary synchronization signal, a secondary synchronization signal, a beam reference signal, or any combination thereof.

21. The apparatus of claim 17, further comprising:
means for receiving an indication of at least one of a cyclic shift, a set of subcarriers, or a sequence index for the scheduling request from the base station.

22. The apparatus of claim 17, wherein the scheduling request comprises a sequence repeated a plurality of times over a plurality of symbol periods.

23. The apparatus of claim 17, wherein the set of time resources for transmitting the random access message is associated with a random access channel (RACH).

24. The apparatus of claim 23, further comprising:
means for identifying a frequency region associated with the RACH and a frequency region associated with scheduling requests that does not overlap with the frequency region associated with the RACH, wherein the scheduling request is transmitted using resources located within the frequency region associated with scheduling requests.

25. The apparatus of claim 23, further comprising:
means for identifying a cyclic prefix length for the scheduling request, wherein the cyclic prefix length comprises a long cyclic prefix length associated with the RACH or a short cyclic prefix length associated with non-RACH transmissions.

26. An apparatus for wireless communication at a base station, comprising:
means for transmitting a directional synchronization subframe comprising a set of directional synchronization signals to a user equipment (UE);
means for receiving a random access message from the UE during a set of time resources selected by the UE based at least in part on a directional synchronization signal of the set of directional synchronization signals and a scheduling request at the UE;
means for transmitting a grant for transmitting a buffer status report (BSR) based at least in part on the random access message; and
means for receiving the BSR from the UE using resources indicated in the grant.

27. The apparatus of claim 26, wherein the resources indicated in the grant comprises physical uplink shared channel (PUSCH) resources, physical uplink control channel (PUCCH) resources, or both.

28. The apparatus of claim 26, wherein the set of time resources for receiving the random access message is associated with a random access channel (RACH).

29. The apparatus of claim 28, further comprising:
means for identifying a frequency region associated with the RACH and a frequency region associated with scheduling requests that does not overlap with the frequency region associated with the RACH, wherein the scheduling request is received using resources located within the frequency region associated with scheduling requests.

30. The apparatus of claim 28, further comprising:
means for identifying a cyclic prefix length for the scheduling request, wherein the cyclic prefix length comprises a long cyclic prefix length associated with the RACH or a short cyclic prefix length associated with non-RACH transmissions.

31. The apparatus of claim 26, further comprising:
means for transmitting an indication of at least one of a cyclic shift, a set of subcarriers, or a sequence index for the scheduling request to the UE.

32. The apparatus of claim 26, wherein the scheduling request comprises a sequence repeated a plurality of times over a plurality of symbol periods.

33. An apparatus for wireless communication, in a system comprising:
a processor;
memory in electronic communication with the processor; and
instructions stored in the memory and operable, when executed by the processor, to cause the apparatus to:
receive, at a user equipment (UE), a directional synchronization subframe comprising a set of directional synchronization signals from a base station;
identify a scheduling request for transmission to the base station;
identify a set of time resources for a random access procedure station based at least in part on a directional synchronization signal of the set of directional synchronization signals;
transmit, by the UE, a random access message to the base station during the set of time resources based at least in part on the identified scheduling request;
receive a grant to transmit a buffer status report (BSR) based at least in part on the scheduling request; and
transmit the BSR to the base station using resources indicated in the grant.

34. The apparatus of claim 33, wherein the resources indicated in the grant comprise physical uplink shared channel (PUSCH) resources, physical uplink control channel (PUCCH) resources, or both.

35. The apparatus of claim 24, wherein the instructions are further executable by the processor to:
identify the directional synchronization signal from the set of directional synchronization signals.

36. The apparatus of claim 33, wherein each set of directional synchronization signals comprises a primary synchronization signal, a secondary synchronization signal, a beam reference signal, or any combination thereof.

37. The apparatus of claim 33, wherein the instructions are further executable by the processor to:
receive an indication of at least one of a cyclic shift, a set of subcarriers, or a sequence index for the scheduling request from the base station.

38. The apparatus of claim 33, wherein the scheduling request comprises a sequence repeated a plurality of times over a plurality of symbol periods.

39. The apparatus of claim 33, wherein the set of time resources for transmitting the random access message is associated with a random access channel (RACH).

40. The apparatus of claim 39, wherein the instructions are further executable by the processor to:
identify a frequency region associated with the RACH and a frequency region associated with scheduling requests that does not overlap with the frequency region associated with the RACH, wherein the scheduling request is transmitted using resources located within the frequency region associated with scheduling requests.

41. The apparatus of claim 39, wherein the instructions are further executable by the processor to:
identify a cyclic prefix length for the scheduling request, wherein the cyclic prefix length comprises a long cyclic prefix length associated with the RACH or a short cyclic prefix length associated with non-RACH transmissions.

42. An apparatus for wireless communication, in a system comprising:
a processor;
memory in electronic communication with the processor; and instructions stored in the memory and operable, when executed by the processor, to cause the apparatus to:
  transmit, by a base station, a directional synchronization subframe comprising a set of directional synchronization signals to a user equipment (UE);
  receive a random access message from the UE during a set of time resources selected by the UE based at least in part on a directional synchronization signal of the set of directional synchronization signals and a scheduling request at the UE;
  transmit a grant for transmitting a buffer status report (BSR) based at least in part on the random access message; and
  receive the BSR from the UE using resources indicated in the grant.

43. The apparatus of claim 42, wherein the resources indicated in the grant comprises physical uplink shared channel (PUSCH) resources, physical uplink control channel (PUCCH) resources, or both.

44. The apparatus of claim 42, wherein the set of time resources for receiving the random access message is associated with a random access channel (RACH).

45. The apparatus of claim 44, wherein the instructions are further executable by the processor to:
  identify a frequency region associated with the RACH and a frequency region associated with scheduling requests that does not overlap with the frequency region associated with the RACH, wherein the scheduling request is received using resources located within the frequency region associated with scheduling requests.

46. The apparatus of claim 44, wherein the instructions are further executable by the processor to:
  identify a cyclic prefix length for the scheduling request, wherein the cyclic prefix length comprises a long cyclic prefix length associated with the RACH or a short cyclic prefix length associated with non-RACH transmissions.

47. The apparatus of claim 42, wherein the instructions are further executable by the processor to:
  transmit an indication of at least one of a cyclic shift, a set of subcarriers, or a sequence index for the scheduling request to the UE.

48. The apparatus of claim 42, wherein the scheduling request comprises a sequence repeated a plurality of times over a plurality of symbol periods.

49. A non-transitory computer readable medium storing code for wireless communication, the code comprising instructions executable by a processor to:
  receive, at a user equipment (UE), a directional synchronization subframe comprising a set of directional synchronization signals from a base station;
  identify a scheduling request for transmission to the base station;
  identify a set of time resources for a random access procedure based at least in part on the a directional synchronization signal of the set of directional synchronization signals;
  transmit, by the UE, a random access message to the base station during the set of time resources based at least in part of the identified scheduling request;
  receive a grant to transmit a buffer status report (BSR) based at least in part on the scheduling request; and
  transmit the BSR to the base station using resources indicated in the grant.

50. The non-transitory computer-readable medium of claim 49, wherein the resources indicated in the grant comprise physical uplink shared channel (PUSCH) resources, physical uplink control channel (PUCCH) resources, or both.

51. The non-transitory computer-readable medium of claim 49, wherein the instructions are further executable by the processor to:
  identifying the directional synchronization signal from the set of directional synchronization signals.

52. The non-transitory computer-readable medium of claim 49, wherein each set of directional synchronization signals comprises a primary synchronization signal, a secondary synchronization signal, a beam reference signal, or any combination thereof.

53. The non-transitory computer-readable medium of claim 49, wherein the instructions are further executable by the processor to:
  receive an indication of at least one of a cyclic shift, a set of subcarriers, or a sequence index for the scheduling request from the base station.

54. The non-transitory computer-readable medium of claim 49, wherein the scheduling request comprises a sequence repeated a plurality of times over a plurality of symbol periods.

55. The non-transitory computer-readable medium of claim 49, wherein the set of time resources for transmitting the random access message is associated with a random access channel (RACH).

56. The non-transitory computer-readable medium of claim 55, wherein the instructions are further executable by the processor to:
  identify a frequency region associated with the RACH and a frequency region associated with scheduling requests that does not overlap with the frequency region associated with the RACH, wherein the scheduling request is transmitted using resources located within the frequency region associated with scheduling requests.

57. The non-transitory computer-readable medium of claim 55, wherein the instructions are further executable by the processor to:
  identify a cyclic prefix length for the scheduling request, wherein the cyclic prefix length comprises a long cyclic prefix length associated with the RACH or a short cyclic prefix length associated with non-RACH transmissions.

58. A non-transitory computer readable medium storing code for wireless communication, the code comprising instructions executable by a processor to:
  transmit, by a base station, a directional synchronization subframe comprising a set of directional synchronization signals to a user equipment (UE);
  receive a random access message from the UE during a set of time resources selected by the UE based at least in part on a directional synchronization signal of the set of directional synchronization signals and a scheduling request at the UE;
  transmit a grant for transmitting a buffer status report (BSR) based at least in part on the random access message; and
  receive the BSR from the UE using resources indicated in the grant.

59. The non-transitory computer-readable medium of claim 58, wherein the resources indicated in the grant comprises physical uplink shared channel (PUSCH) resources, physical uplink control channel (PUCCH) resources, or both.

60. The non-transitory computer-readable medium of claim 58, wherein the set of time resources for receiving the random access message is associated with a random access channel (RACH).

61. The non-transitory computer-readable medium of claim 60, wherein the instructions are further executable by the processor to:
identify a frequency region associated with the RACH and a frequency region associated with scheduling requests that does not overlap with the frequency region associated with the RACH, wherein the scheduling request is received using resources located within the frequency region associated with scheduling requests.

62. The non-transitory computer-readable medium of claim 60, wherein the instructions are further executable by the processor to:
identify a cyclic prefix length for the scheduling request, wherein the cyclic prefix length comprises a long cyclic prefix length associated with the RACH or a short cyclic prefix length associated with non-RACH transmissions.

63. The non-transitory computer-readable medium of claim 58, wherein the instructions are further executable by the processor to:
transmit an indication of at least one of a cyclic shift, a set of subcarriers, or a sequence index for the scheduling request to the UE.

64. The non-transitory computer-readable medium of claim 58, wherein the scheduling request comprises a sequence repeated a plurality of times over a plurality of symbol periods.

* * * * *